United States Patent
Mizuta

(10) Patent No.: US 10,895,720 B2
(45) Date of Patent: Jan. 19, 2021

(54) IMAGING OPTICAL SYSTEM, MICROSCOPE APPARATUS INCLUDING THE IMAGING OPTICAL SYSTEM, AND STEREOSCOPIC MICROSCOPE APPARATUS

(71) Applicant: NIKON CORPORATION, Tokyo (JP)

(72) Inventor: Masahiro Mizuta, Kawasaki (JP)

(73) Assignee: NIKON CORPORATION, Tokyo (JP)

( * ) Notice: Subject to any disclaimer, the term of this patent is extended or adjusted under 35 U.S.C. 154(b) by 0 days.

(21) Appl. No.: 16/559,233

(22) Filed: Sep. 3, 2019

(65) Prior Publication Data

US 2020/0026046 A1     Jan. 23, 2020

Related U.S. Application Data

(60) Continuation of application No. 13/909,456, filed on Jun. 4, 2013, now abandoned, which is a division of
(Continued)

(30) Foreign Application Priority Data

Jan. 29, 2009 (JP) ................... 2009-018207
Mar. 13, 2009 (JP) ................... 2009-061032
(Continued)

(51) Int. Cl.
    *G02B 15/14*     (2006.01)
    *G02B 21/02*     (2006.01)
    (Continued)

(52) U.S. Cl.
    CPC ........... *G02B 15/14* (2013.01); *G02B 21/025* (2013.01); *G02B 21/082* (2013.01); *G02B 21/22* (2013.01)

(58) Field of Classification Search
    CPC .... G02B 21/18; G02B 21/22; G02B 21/0012; G02B 21/20; G02B 21/367; G02B 21/002;
(Continued)

(56) References Cited

U.S. PATENT DOCUMENTS

| 3,679,286 A | 7/1972 | Klein |
| 4,525,042 A | 6/1985 | Muchel |
| (Continued) | | |

FOREIGN PATENT DOCUMENTS

| EP | 0085308 A1 | 1/1983 |
| EP | 0310514 A2 | 9/1988 |
| (Continued) | | |

OTHER PUBLICATIONS

Communication Pursuant to Article 94(3) EPC, dated Jun. 15, 2020, in European Application No. 12153521.5 (5 pp.).
(Continued)

*Primary Examiner* — William R Alexander
*Assistant Examiner* — Sharrief I Broome

(57) ABSTRACT

A variable power optical system 3 used in a parallel stereoscopic microscope apparatus 100 and the like includes a plurality of optical paths in which optical axes are arranged substantially parallel, includes a plurality of lens groups that change the magnification of a diameter of a luminous flux entering substantially parallel to each of the optical paths to eject the luminous flux as substantially parallel luminous fluxes, and at least two lens groups move along the optical axis in each optical path according to the change in the magnification. At least two lens groups of at least one optical path among the plurality of optical paths move in a direction including a component perpendicular to the optical axis according to the change in the magnification at at least part
(Continued)

of a section where the magnification is changed from a high-power end state to a low-power end.

11 Claims, 31 Drawing Sheets

Related U.S. Application Data application No. 13/190,733, filed on Jul. 26, 2011, now Pat. No. 8,477,417, which is a continuation of application No. PCT/JP2010/050872, filed on Jan. 25, 2010.

(30) Foreign Application Priority Data

| Apr. 10, 2009 | (JP) | 2009-095469 |
| Jun. 10, 2009 | (JP) | 2009-138876 |
| Jul. 31, 2009 | (JP) | 2009-178820 |
| Nov. 26, 2009 | (JP) | 2009-268501 |

(51) Int. Cl.
  *G02B 21/22* (2006.01)
  *G02B 21/08* (2006.01)

(58) Field of Classification Search
  CPC .... G02B 21/025; G02B 21/24; G02B 21/082; G02B 21/26; G02B 21/00; G02B 21/0032; G02B 21/365; G02B 7/001; G02B 15/14; G02B 17/045; G02B 21/0004; G02B 21/0016; G02B 21/0024; G02B 21/0036; A61B 90/20; A61B 1/307; A61B 1/31; A61B 3/13; A61B 3/132; A61B 3/135; A61B 90/30; A61B 90/36; A61B 90/25; A61B 90/50
  See application file for complete search history.

(56) References Cited

U.S. PATENT DOCUMENTS

| 5,074,650 | A | 12/1991 | Yamagishi et al. | |
| 5,227,914 | A | 7/1993 | Hanzawa et al. | |
| 6,335,833 | B1 | 1/2002 | Kawasaki | |
| 2003/0210470 | A1* | 11/2003 | Zimmer | G02B 21/025 359/686 |
| 2003/0227672 | A1* | 12/2003 | Zimmer | G02B 21/22 359/376 |
| 2005/0174634 | A1 | 8/2005 | Nemoto et al. | |
| 2005/0174654 | A1* | 8/2005 | Kawasaki | G02B 15/17 359/676 |
| 2006/0114554 | A1* | 6/2006 | Suzuki | G02B 21/248 359/380 |
| 2006/0256429 | A1* | 11/2006 | Obrebski | G02B 15/00 359/380 |
| 2007/0047073 | A1* | 3/2007 | Zimmer | G02B 21/22 359/377 |
| 2008/0174861 | A1 | 7/2008 | Uzawa et al. | |
| 2009/0002842 | A1 | 1/2009 | Souma | |
| 2010/0259815 | A1* | 10/2010 | Nakamura | G02B 21/0012 359/376 |
| 2012/0008194 | A1* | 1/2012 | Mizuta | G02B 21/22 359/377 |

FOREIGN PATENT DOCUMENTS

| JP | 7-27981 | 1/1995 |
| JP | 09318882 | 12/1997 |
| JP | 2002-328308 | 11/2002 |
| JP | 2005-91755 | 4/2005 |
| JP | 2005-221998 | 8/2005 |
| JP | 2007-298898 | 11/2007 |
| JP | 2008-102535 | 5/2008 |
| JP | 2009002991 | 1/2009 |
| JP | 2009014819 | 1/2009 |

OTHER PUBLICATIONS

Communication Pursuant to Article 94(3) EPC, dated Jun. 15, 2020, in European Application No. 12153524.9 (5 pp.).
Communication Pursuant to Article 94(3) EPC, dated Jun. 15, 2020, in European Application No. 12153527.2 (5 pp.).
Notice of Allowance, dated Jul. 1, 2020, in U.S. Appl. No. 16/559,212 (30 pp.).
Extended European Search Report dated Jul. 23, 2015 in corresponding European Patent Application No. 12153524.9, 32 pages.
Extended European Search Report dated Aug. 4, 2015 in corresponding European Patent Application No. 12153527.2, 49 pages.
Extended European Search Report dated Aug. 11, 2015 in corresponding European Patent Application No. 12153521.5, 34 pages.
Japanese Office Action dated Mar. 28, 2013 in corresponding Japanese Patent Application No. 2010-548488.
Written Opinion dated Apr. 6, 2010 in corresponding PCT Application No. PCT/JP2010/050872.
Extended European Search Report dated Jul. 5, 2012 in corresponding European Patent Application No. 10735764.2.
Japanese Patent Office Notice of Reasons for Rejection dated Jun. 20, 2013 for corresponding Japanese Patent Application No. 2010-548488.
International Search Report for PCT/JP2010/050872, dated Apr. 6, 2010.
European Office Action for European Application No. 10735764.2 dated Aug. 28, 2018 (four pages).
Communication pursuant to Article 94(3) EPC dated Apr. 17, 2019 in corresponding European Application No. 10 735 764.2. 5 pages.
U.S. Appl. No. 13/190,733, filed Jul. 26, 2011, Masahiro Mizuta, et al., Nikon Corporation.
U.S. Appl. No. 13/909,456, filed Jun. 4, 2013, Masahiro Mizuta, et al., Nikon Corporation.
U.S. Appl. No. 16/559,212, filed Sep. 3, 2019, Masahiro Mizuta, Nikon Corporation.
Notice to File Missing Parts of Nonprovisional Application dated Aug. 9, 2011 in U.S. Appl. No. 13/190,733.
Office Action dated Aug. 8, 2012 in U.S. Appl. No. 13/190,733.
Office Action dated Nov. 20, 2012 in U.S. Appl. No. 13/190,733.
Notice of Allowance dated Mar. 7, 2013 in U.S. Appl. No. 13/190,733.
Office Action dated Mar. 16, 2015 in U.S. Appl. No. 13/909,456.
Final Office Action dated Dec. 16, 2015 in U.S. Appl. No. 13/909,456.
Office Action dated Sep. 9, 2016 in U.S. Appl. No. 13/909,456.
Final Office Action dated Jun. 15, 2017 in U.S. Appl. No. 13/909,456.
Office Action dated Jan. 26, 2018 in U.S. Appl. No. 13/909,456.
Final Office Action dated Nov. 6, 2018 in U.S. Appl. No. 13/909,456.
Notice of Allowance dated Jun. 3, 2019 in U.S. Appl. No. 13/909,456.

* cited by examiner

【FIG.1】
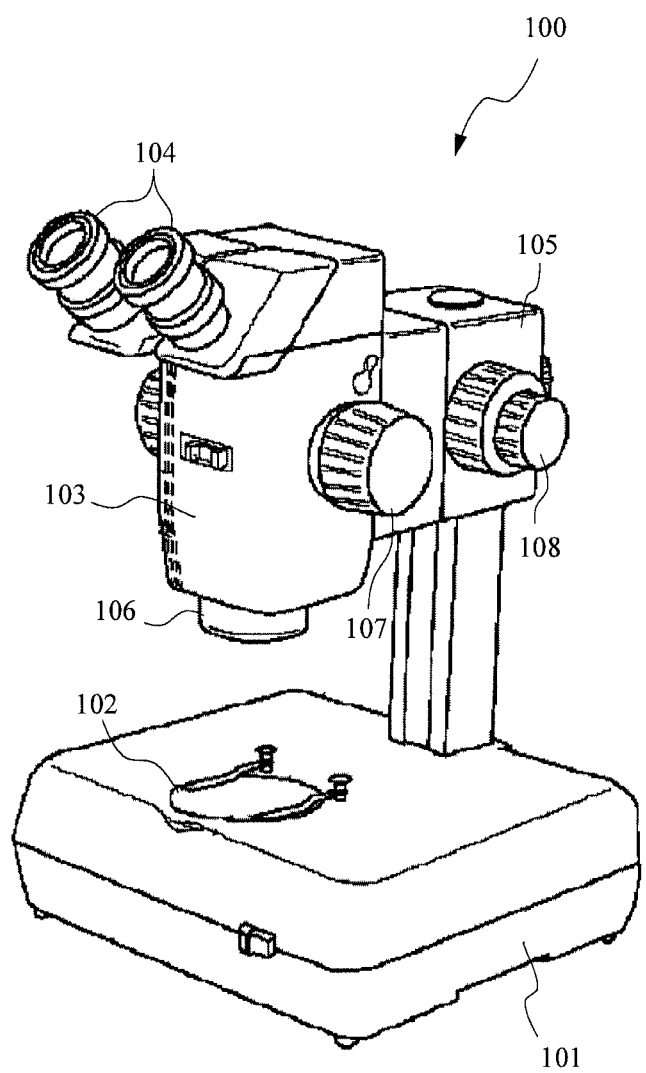

[FIG.2]
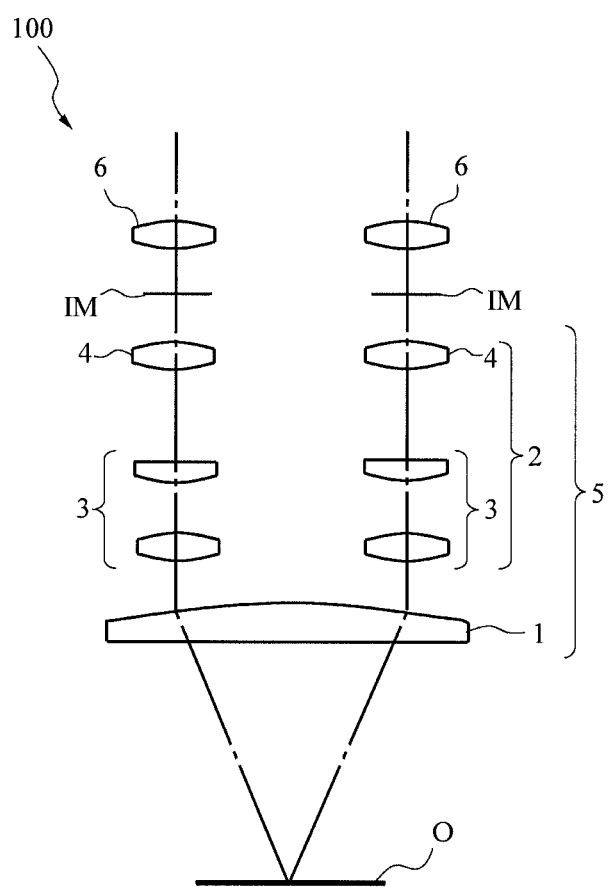

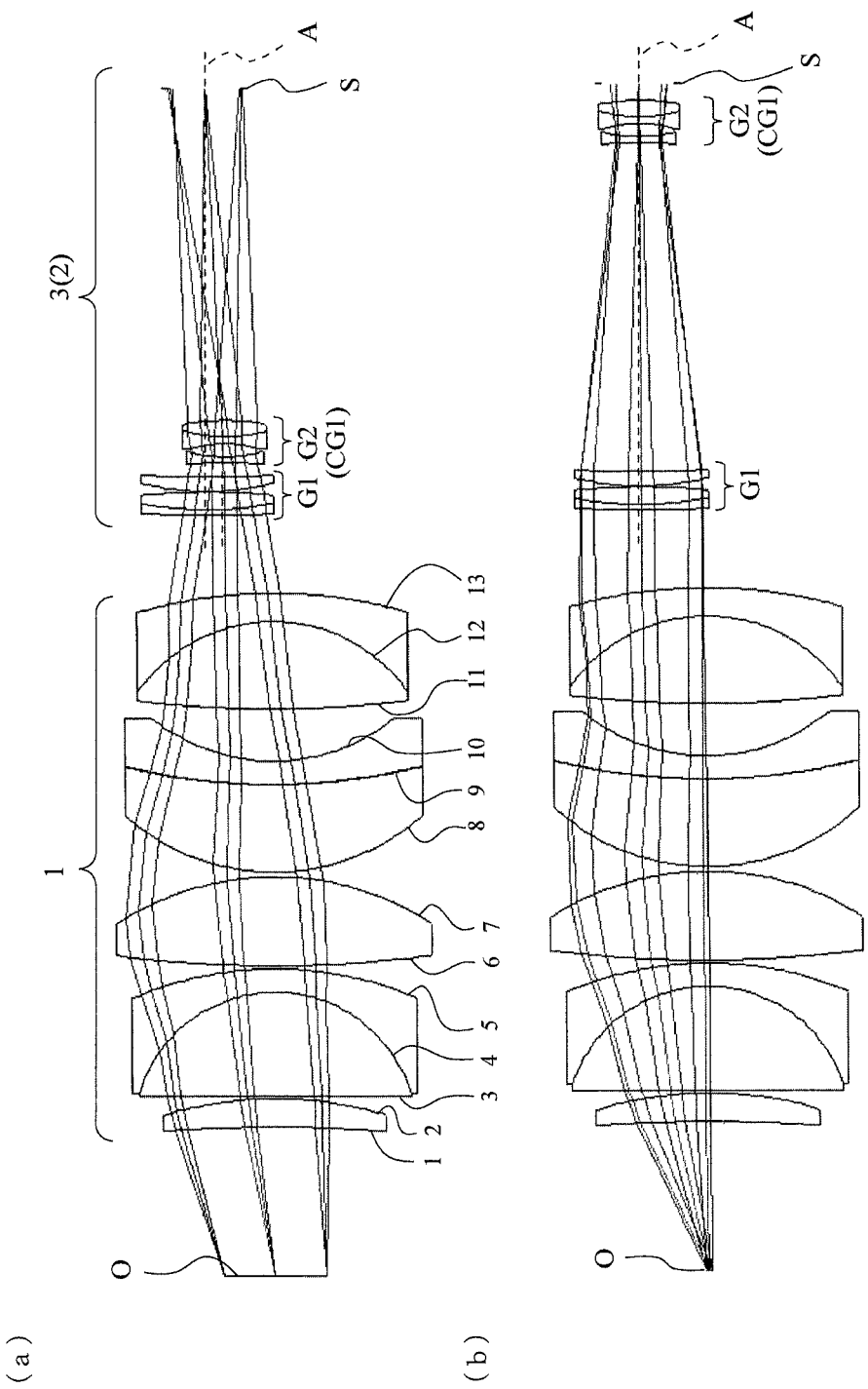

[FIG.4]
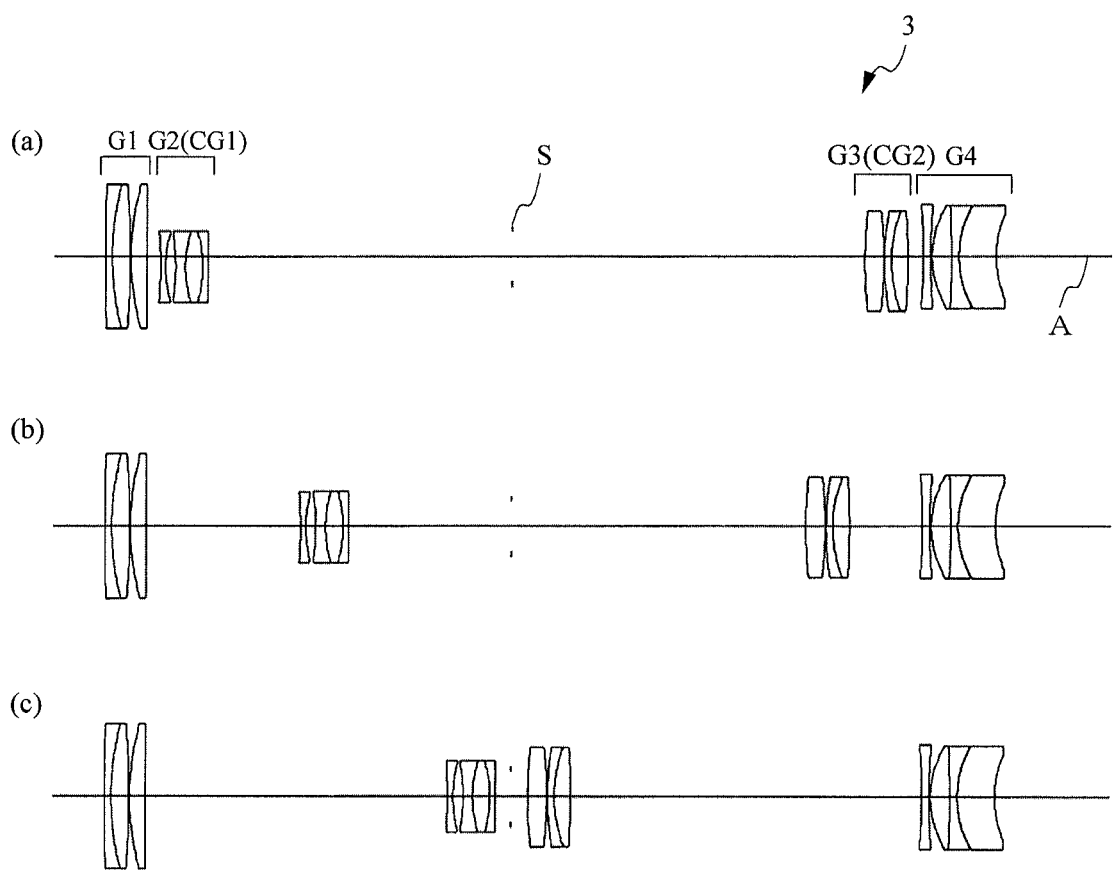

[FIG.5]
(a) LOWEST POWER (CORRECTION WITH G3)
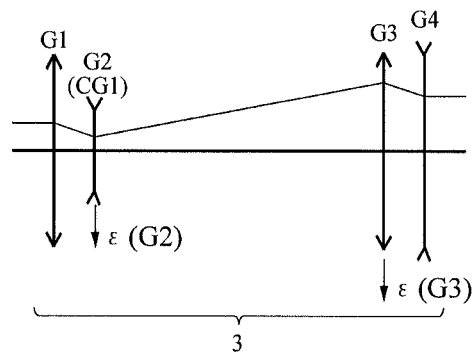
(b) LOWEST POWER (CORRECTION WITH G4)
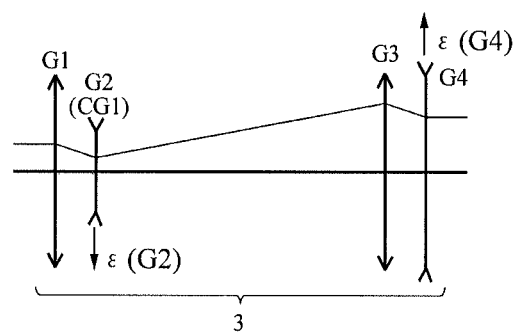
(c) HIGHEST POWER
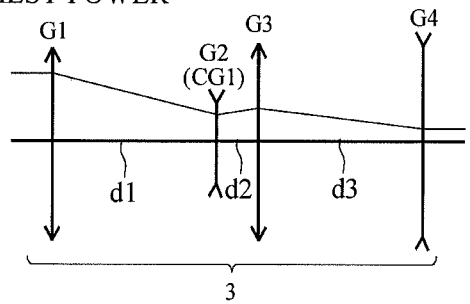

[FIG.6]
(a) LOWEST POWER (CORRECTION WITH G3)
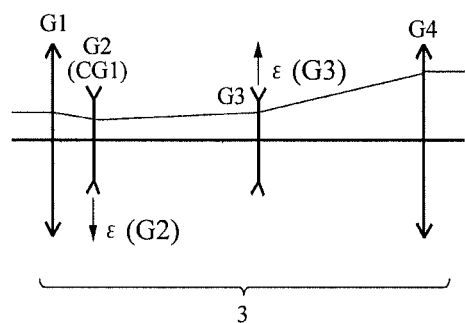
(b) LOWEST POWER (CORRECTION WITH G4)
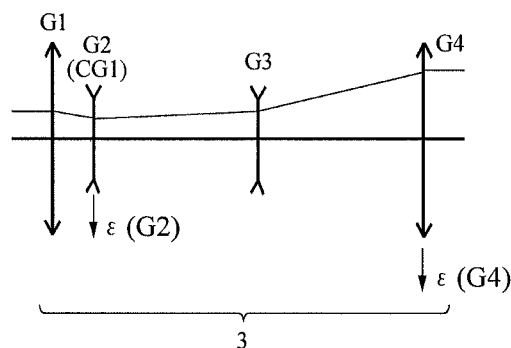
(c) HIGHEST POWER
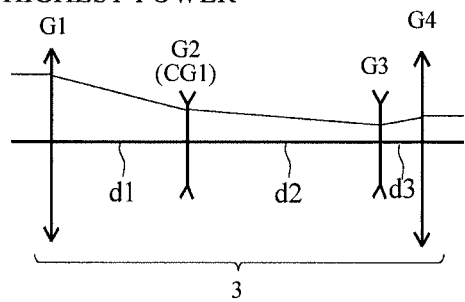

[FIG.7]
(a) LOWEST POWER (CORRECTION WITH G3)
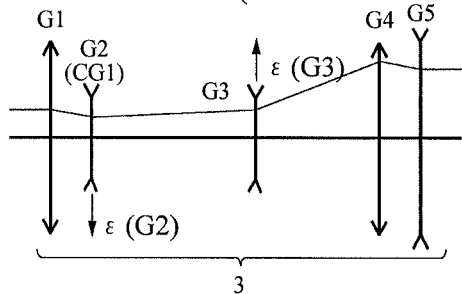
(b) LOWEST POWER (CORRECTION WITH G4)
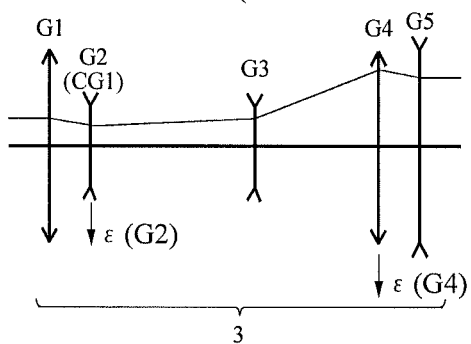
(c) LOWEST POWER (CORRECTION WITH G5)
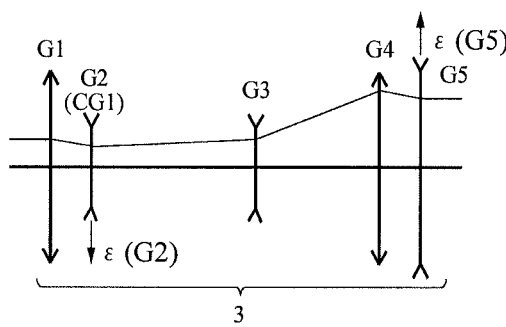
(d) HIGHEST POWER
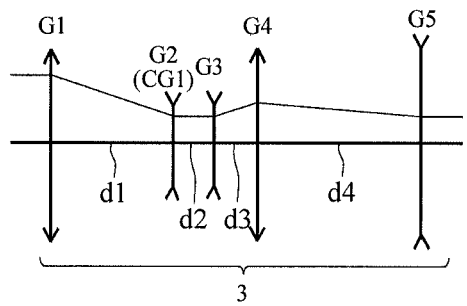

[FIG.8]
(a) LOWEST POWER (CORRECTION WITH G3)
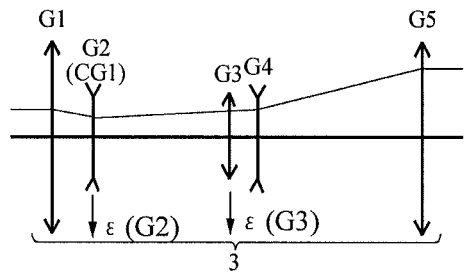
(b) LOWEST POWER (CORRECTION WITH G4)
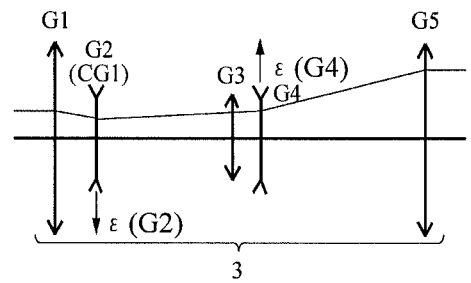
(c) LOWEST POWER (CORRECTION WITH G5)
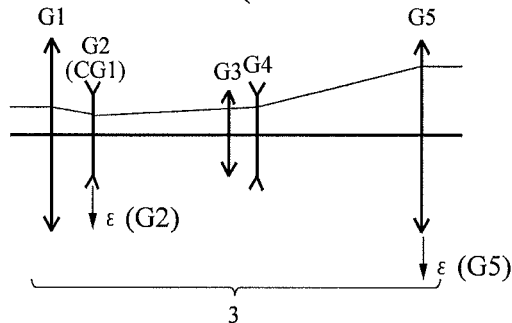
(d) HIGHEST POWER
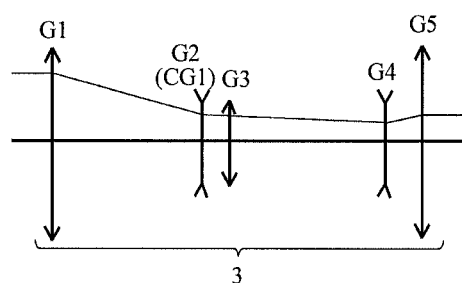

[FIG.9]
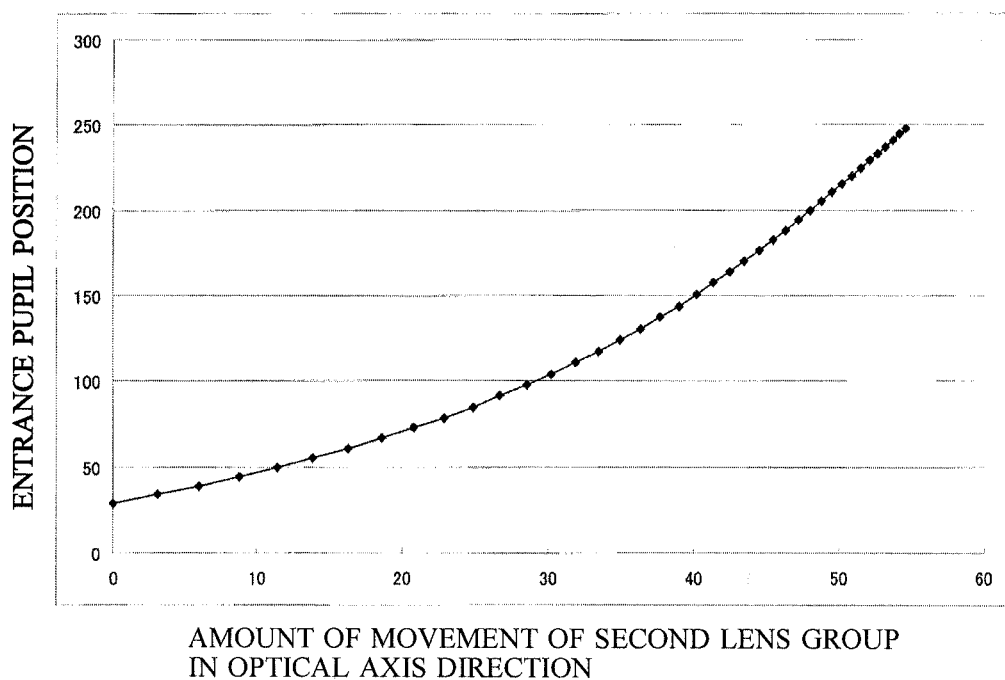
AMOUNT OF MOVEMENT OF SECOND LENS GROUP
IN OPTICAL AXIS DIRECTION

[FIG.10]
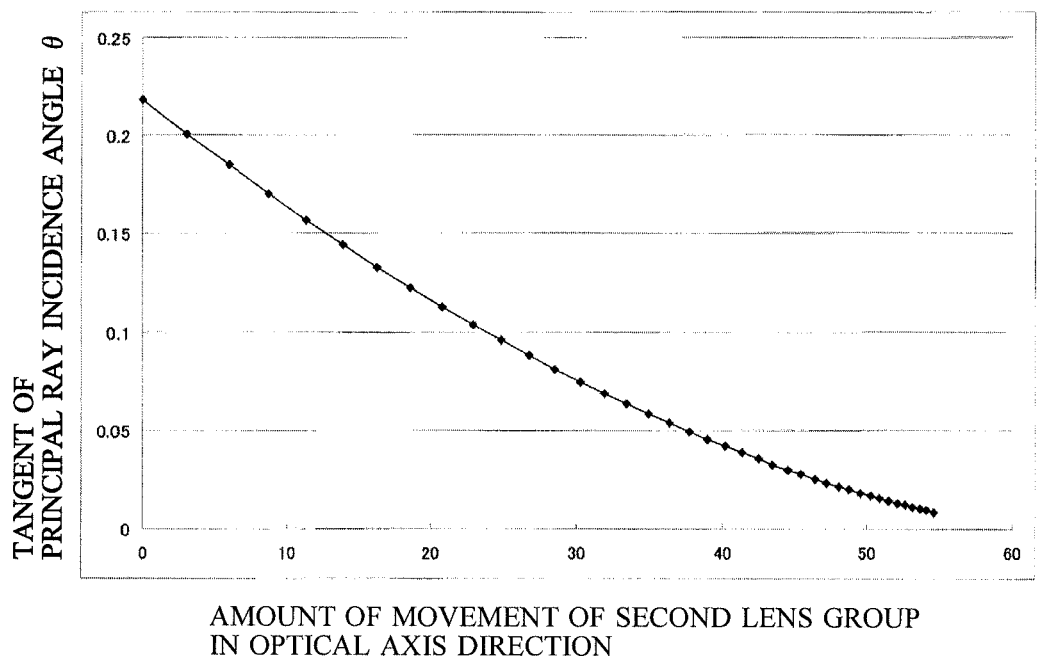

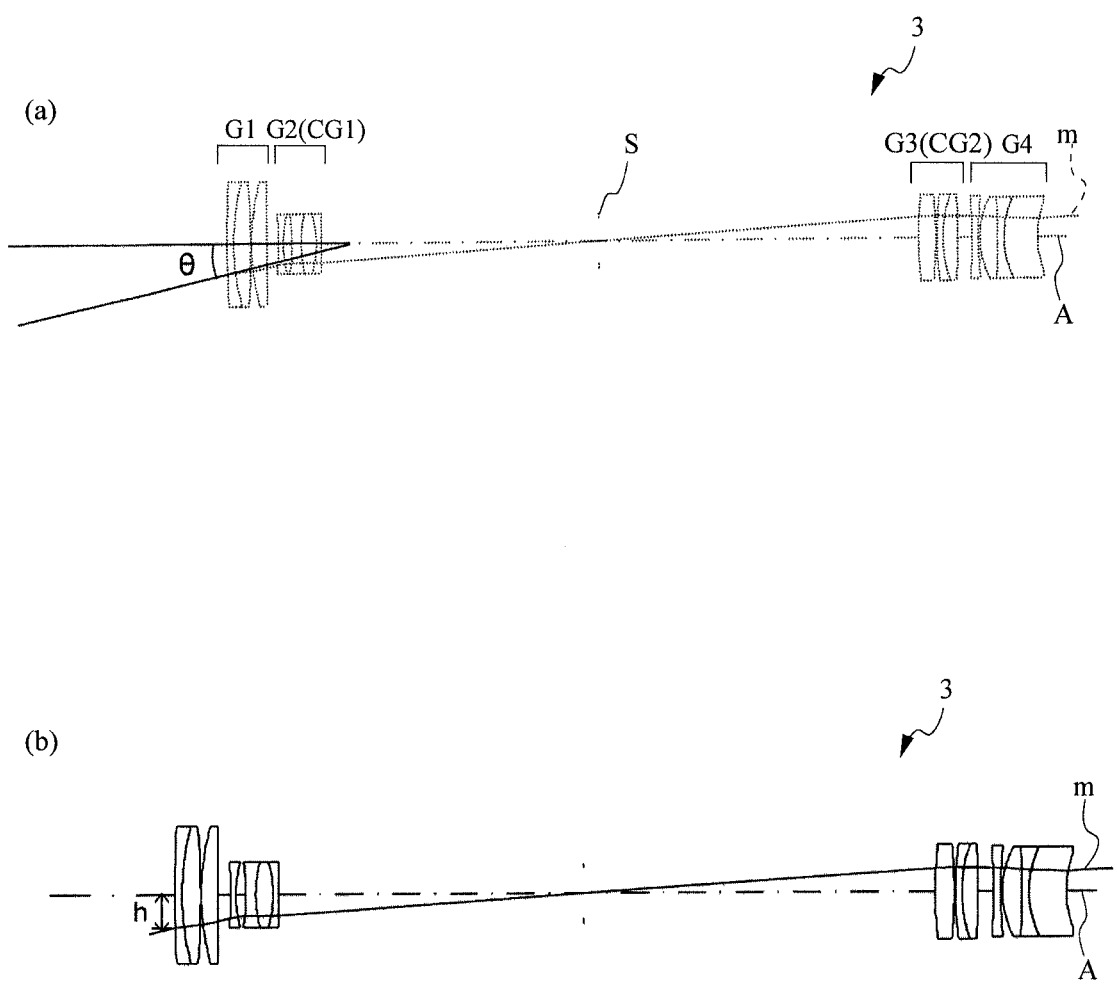
[FIG.11]

[FIG.12]
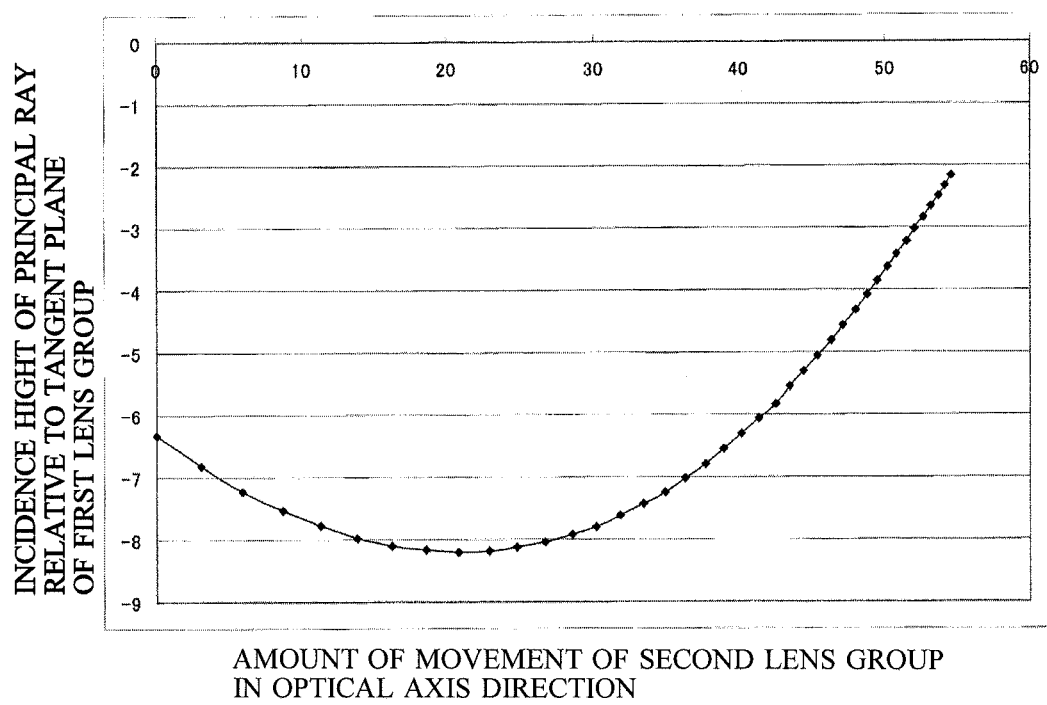
AMOUNT OF MOVEMENT OF SECOND LENS GROUP
IN OPTICAL AXIS DIRECTION

[FIG.13]
(a)
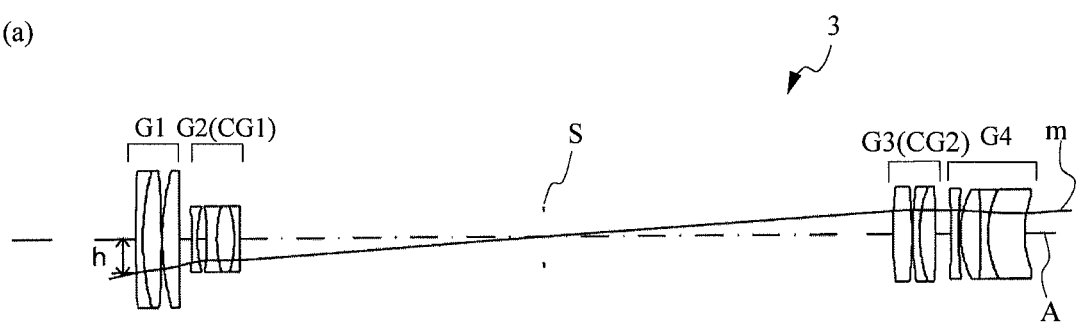
(b)

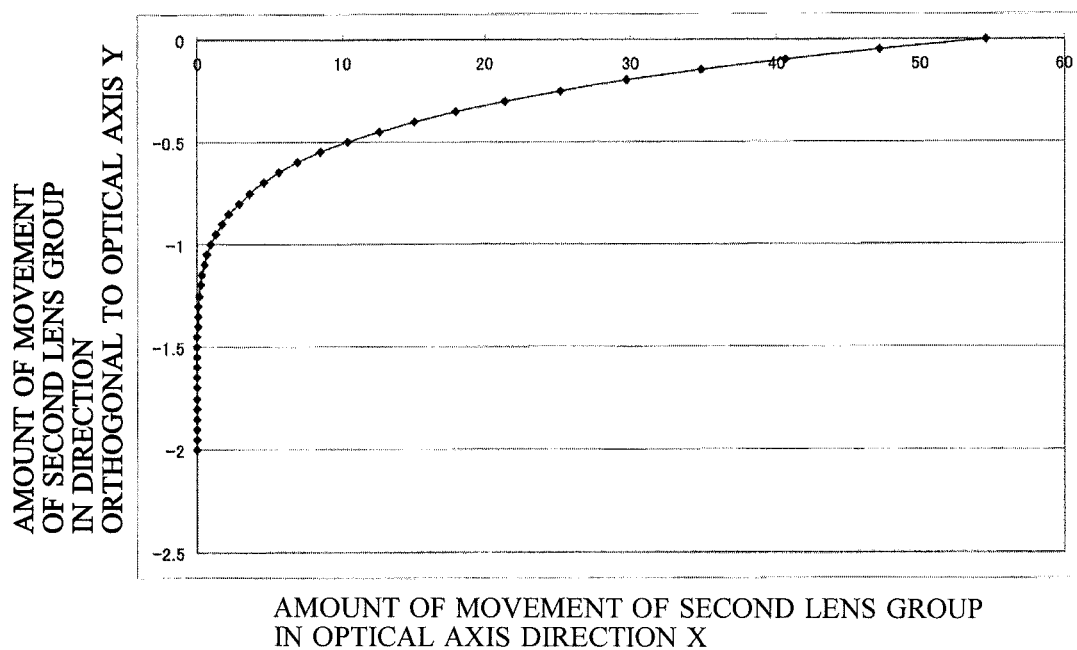

[FIG.15]
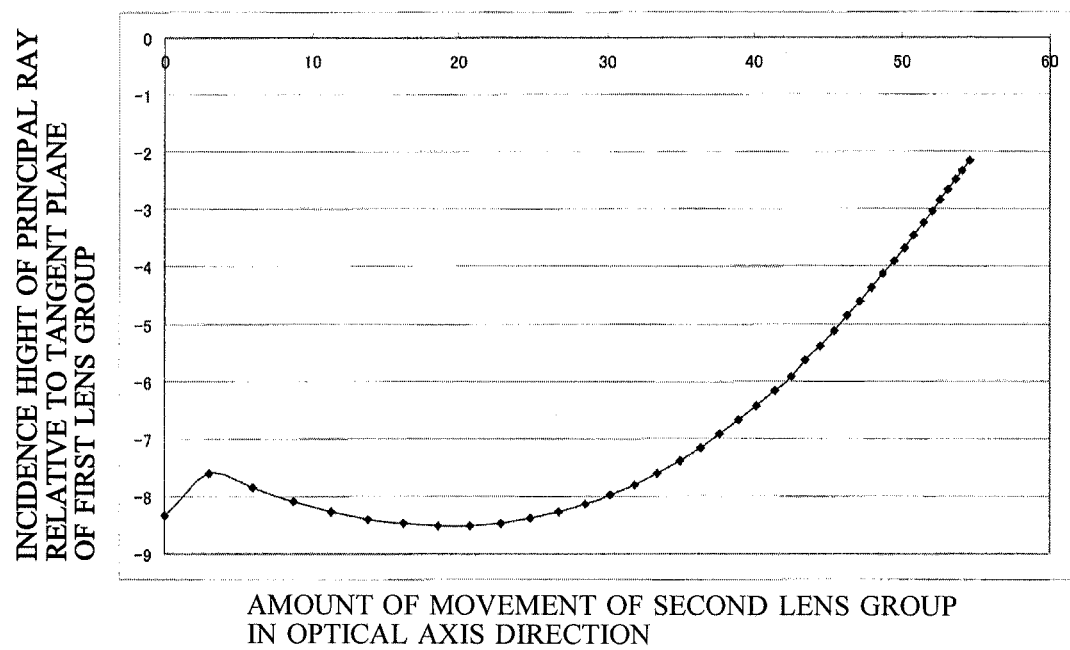

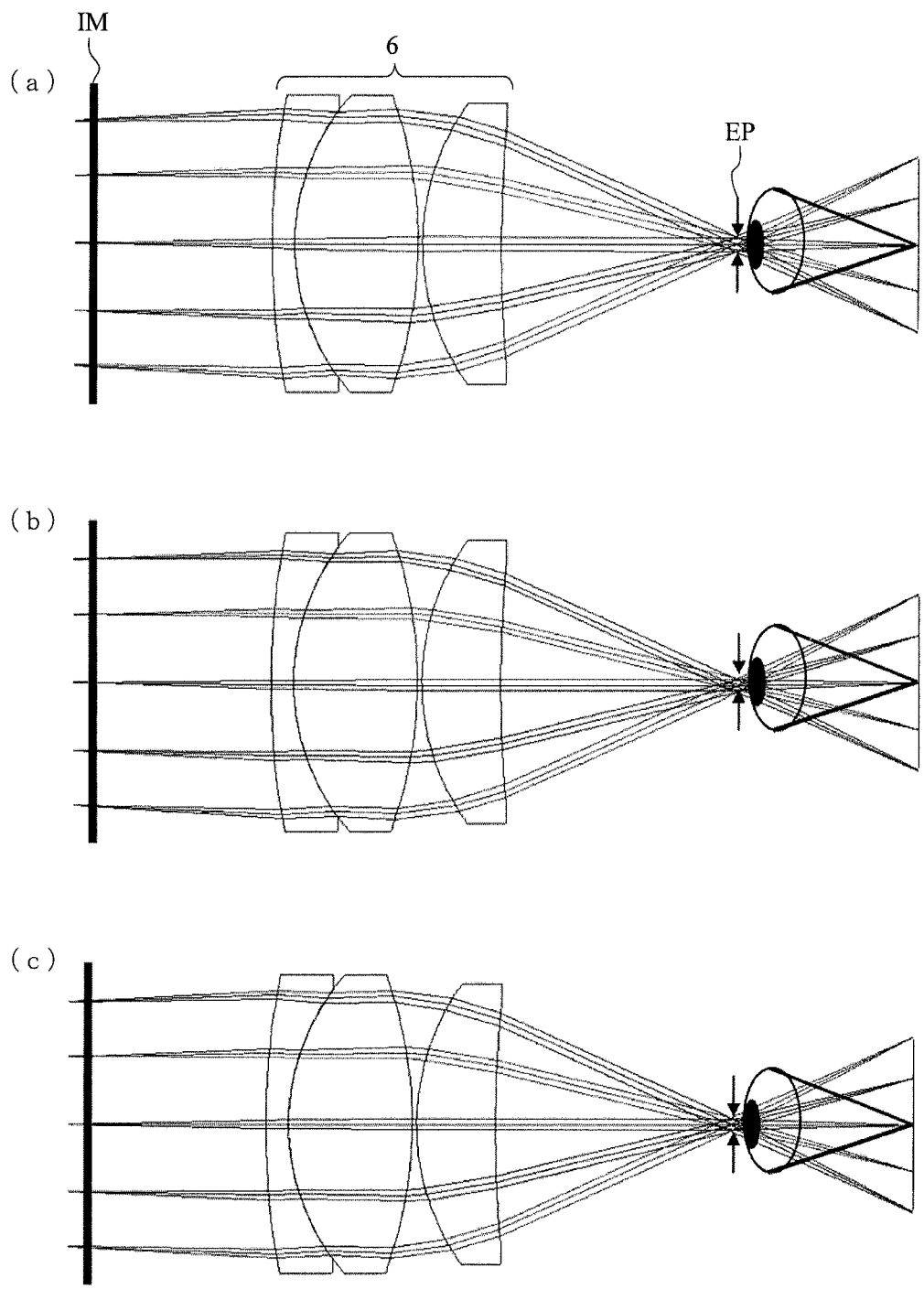
[FIG.16]

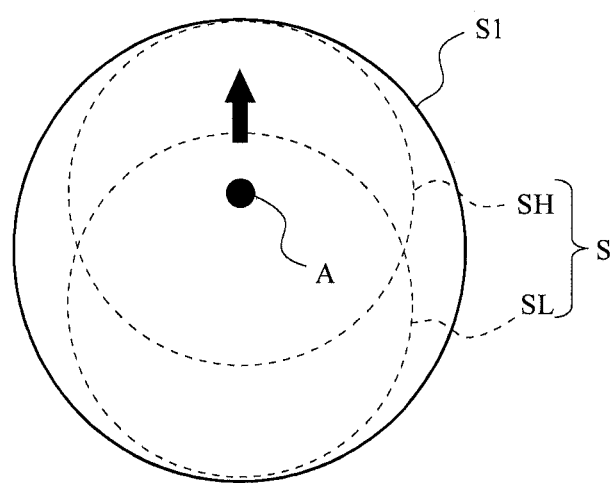
[FIG.17]

[FIG.18]
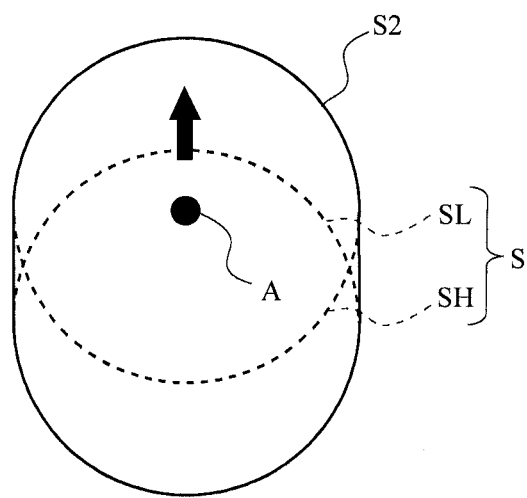

[FIG.19]
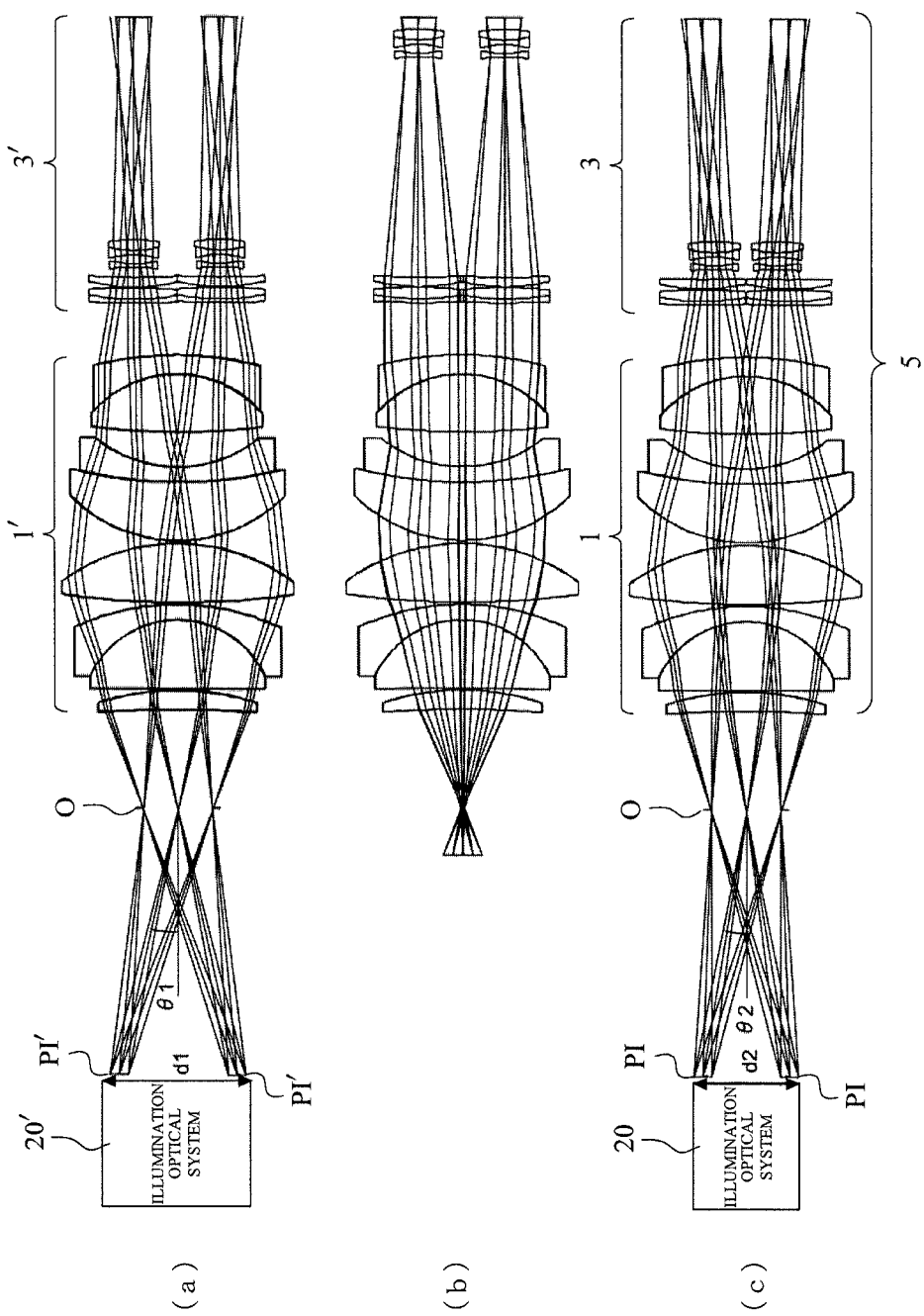

[FIG.20]
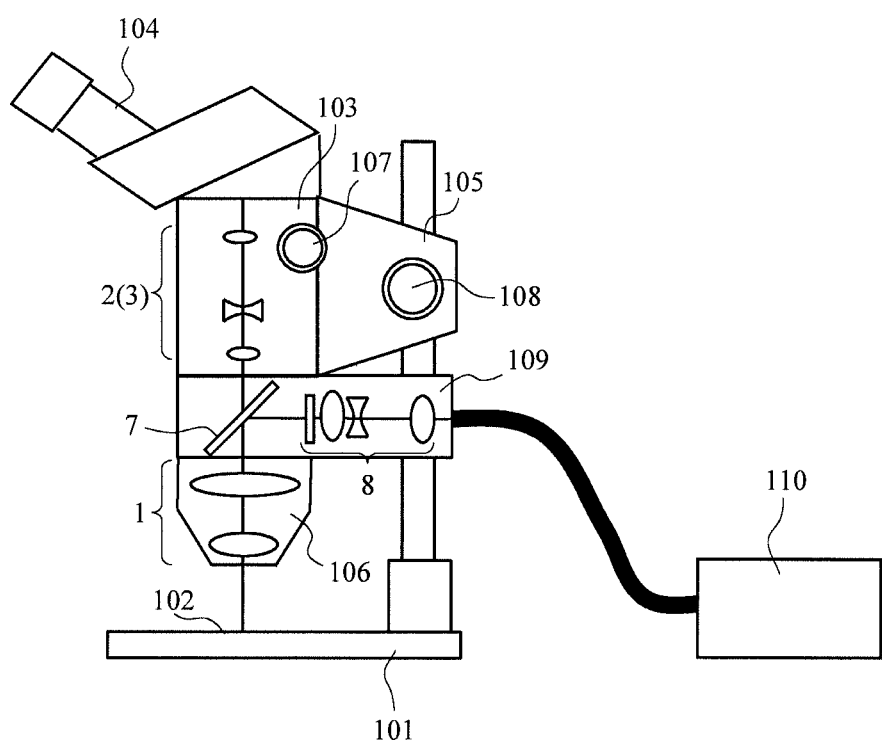

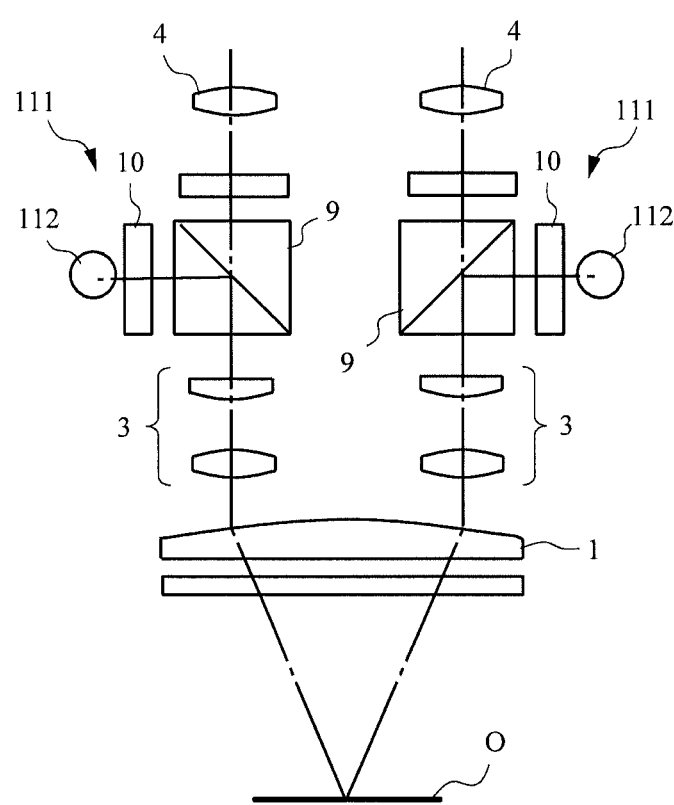
[FIG.21]

[FIG.22]
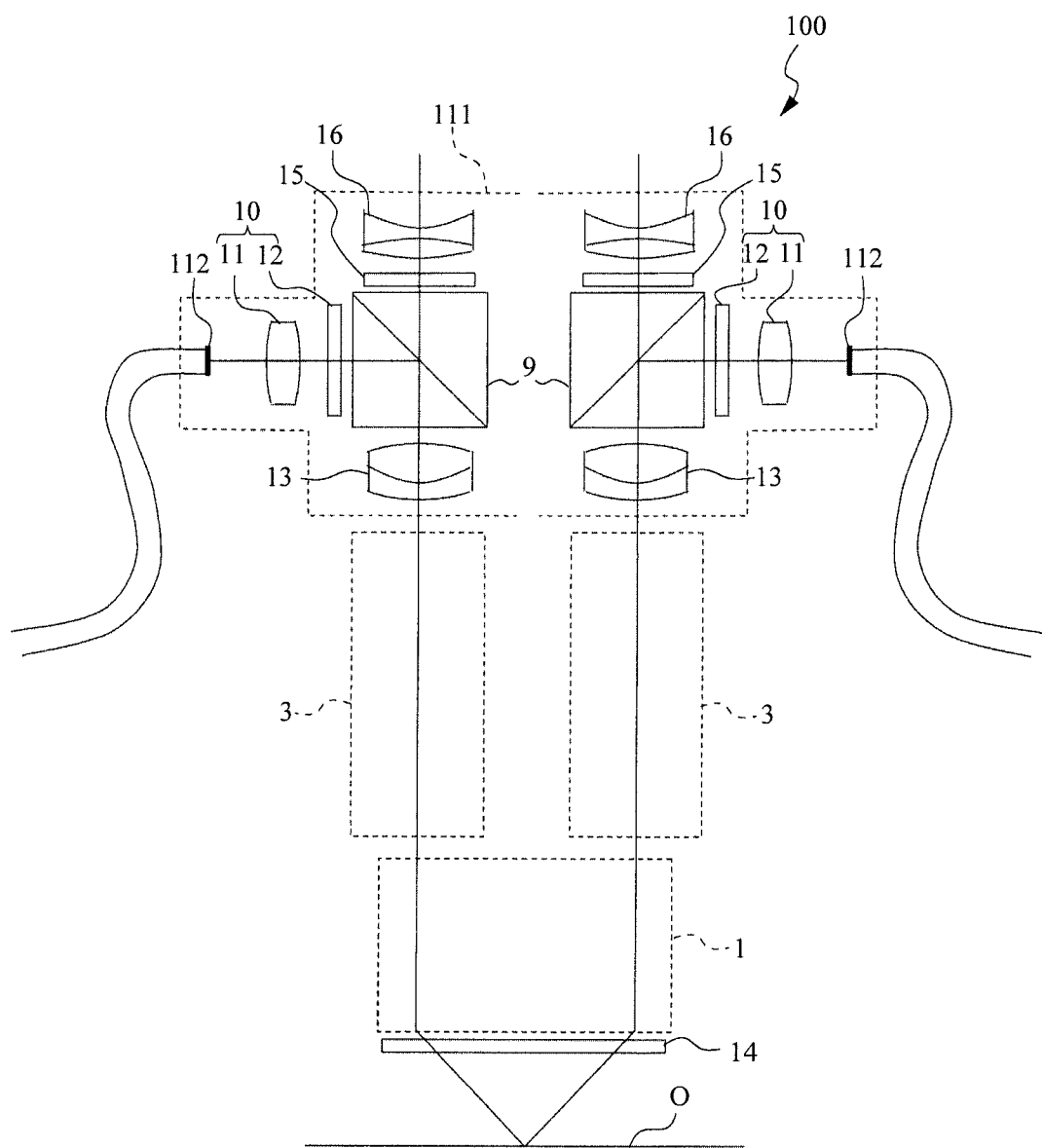

[FIG.23]
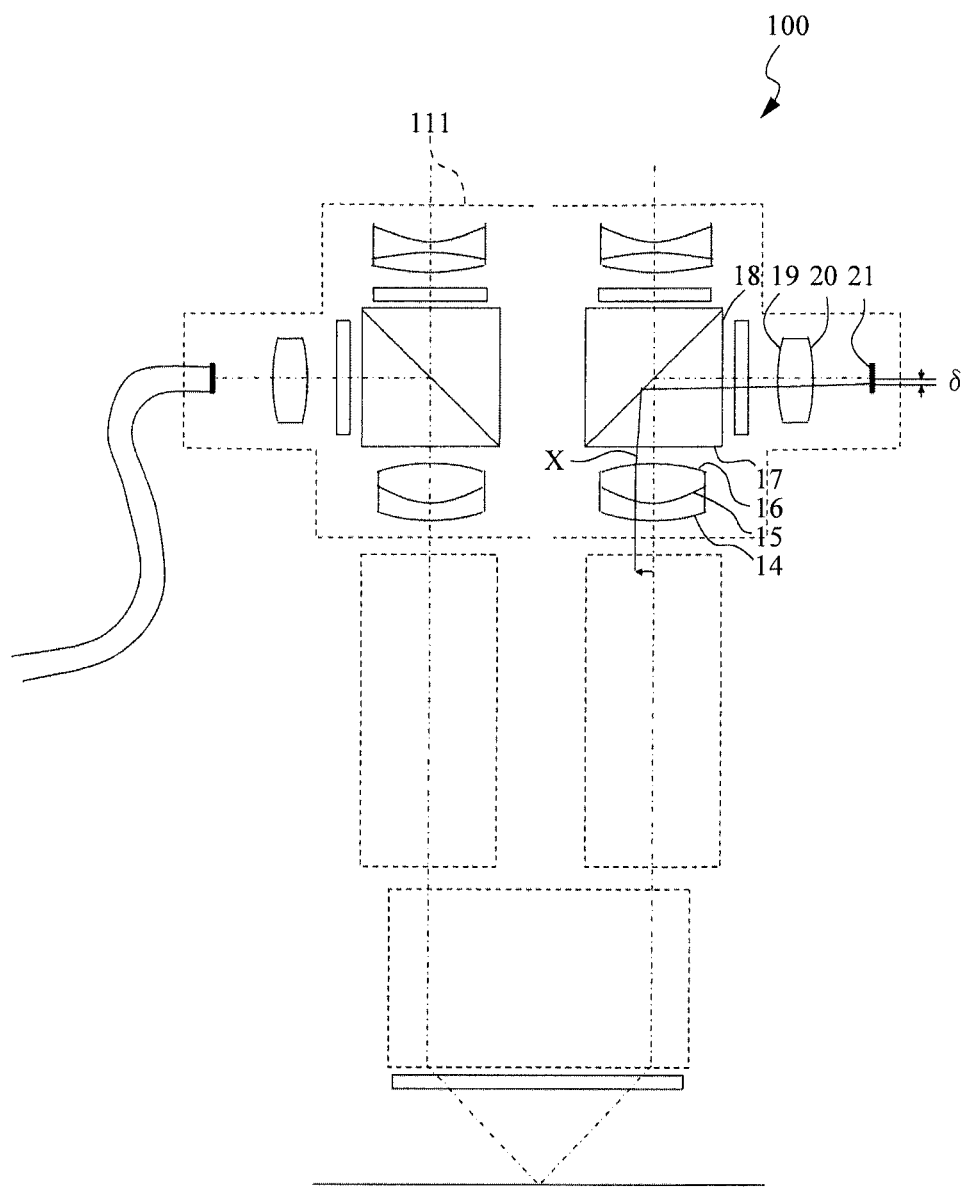

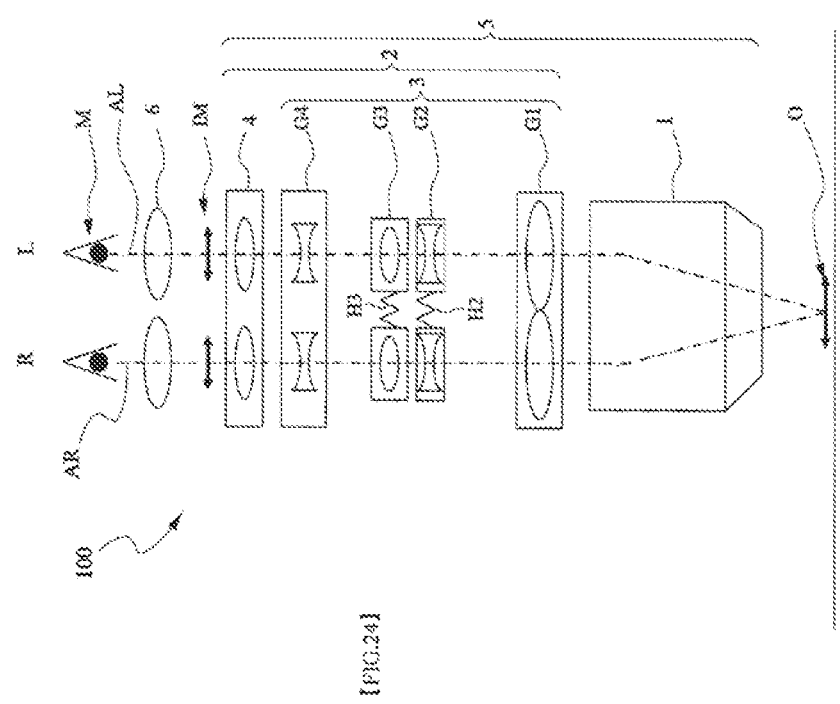
[FIG.24]

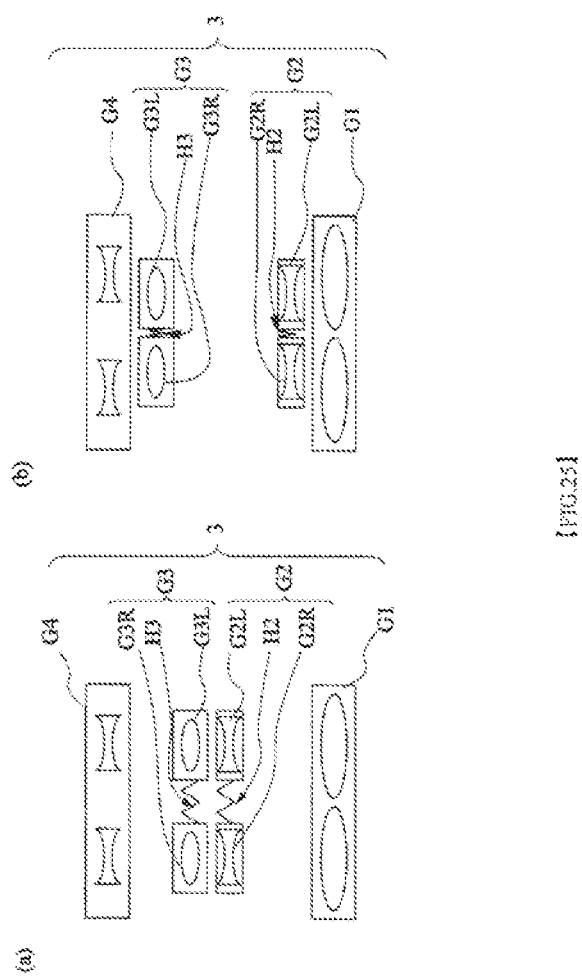

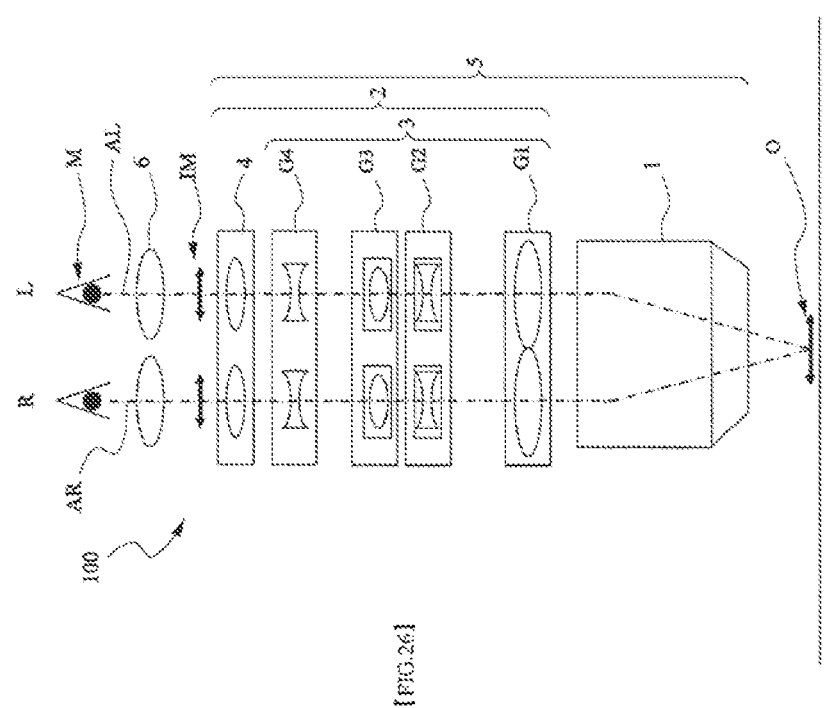
[FIG. 24]

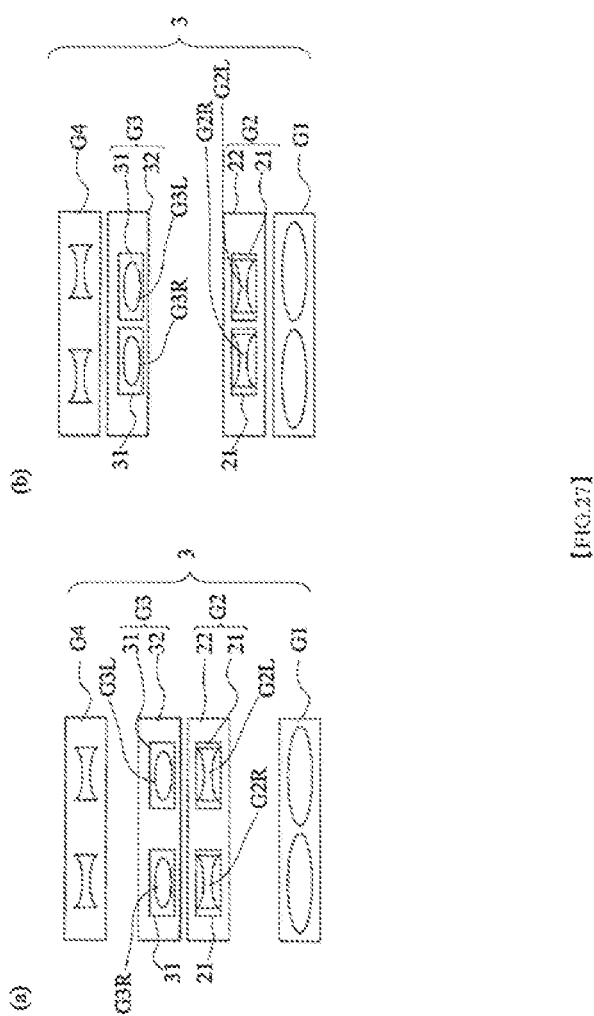

[FIG.28]
(a)
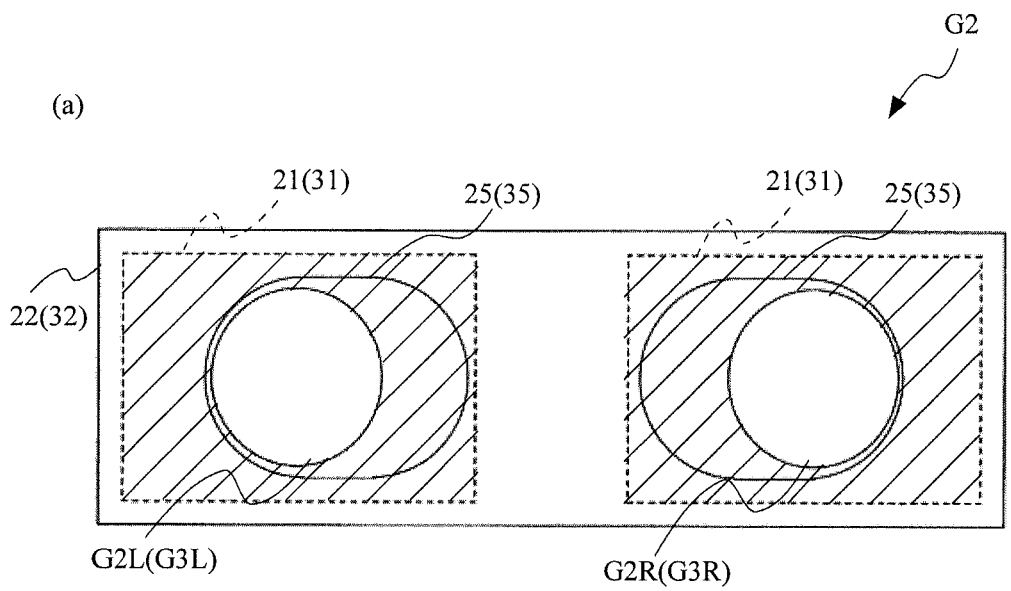
(b)
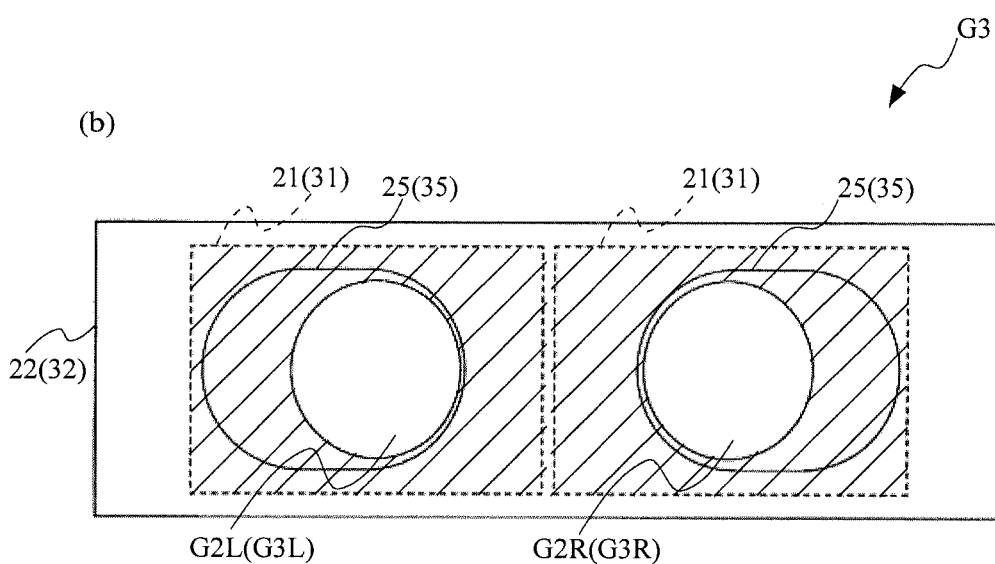

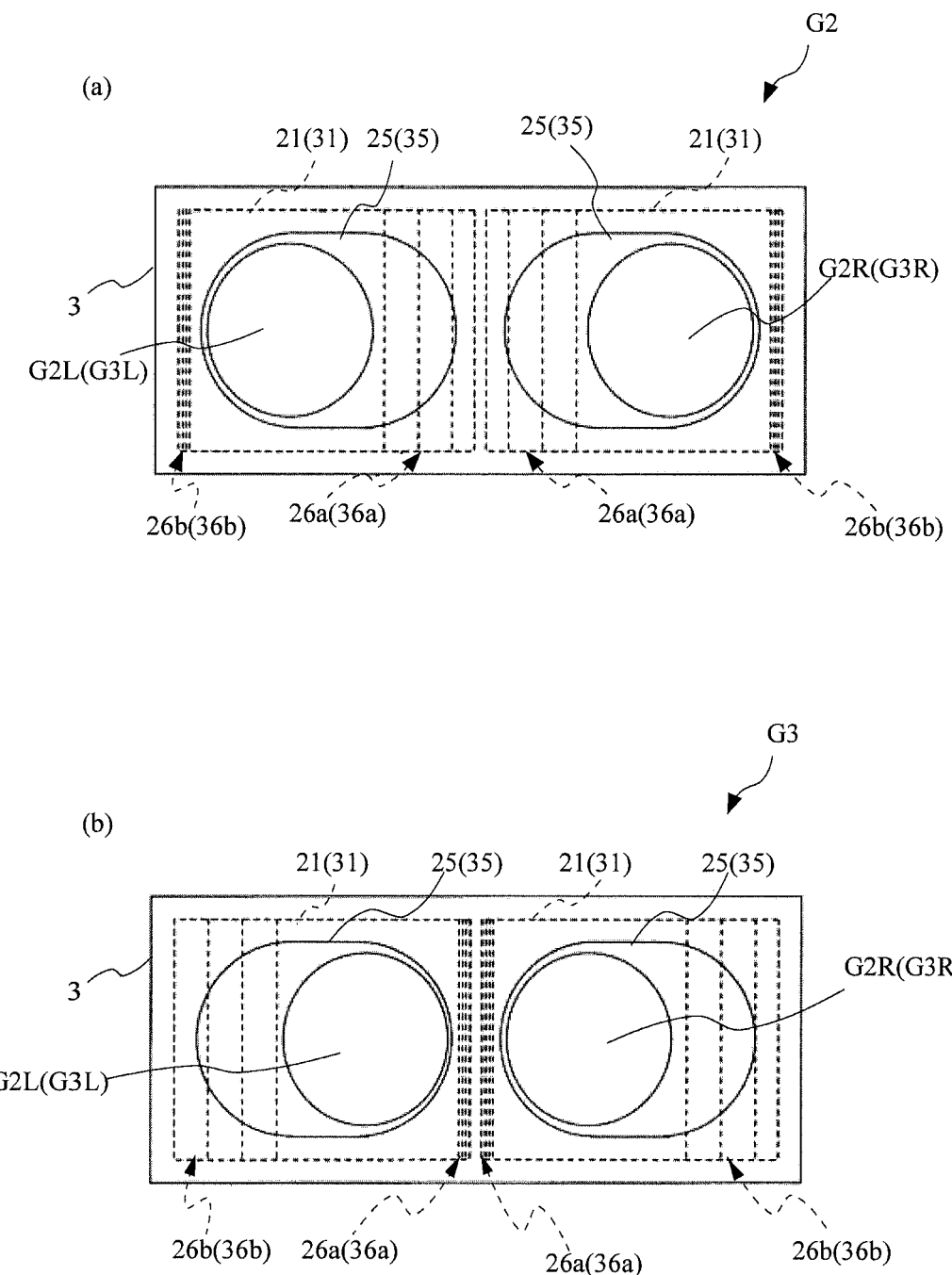

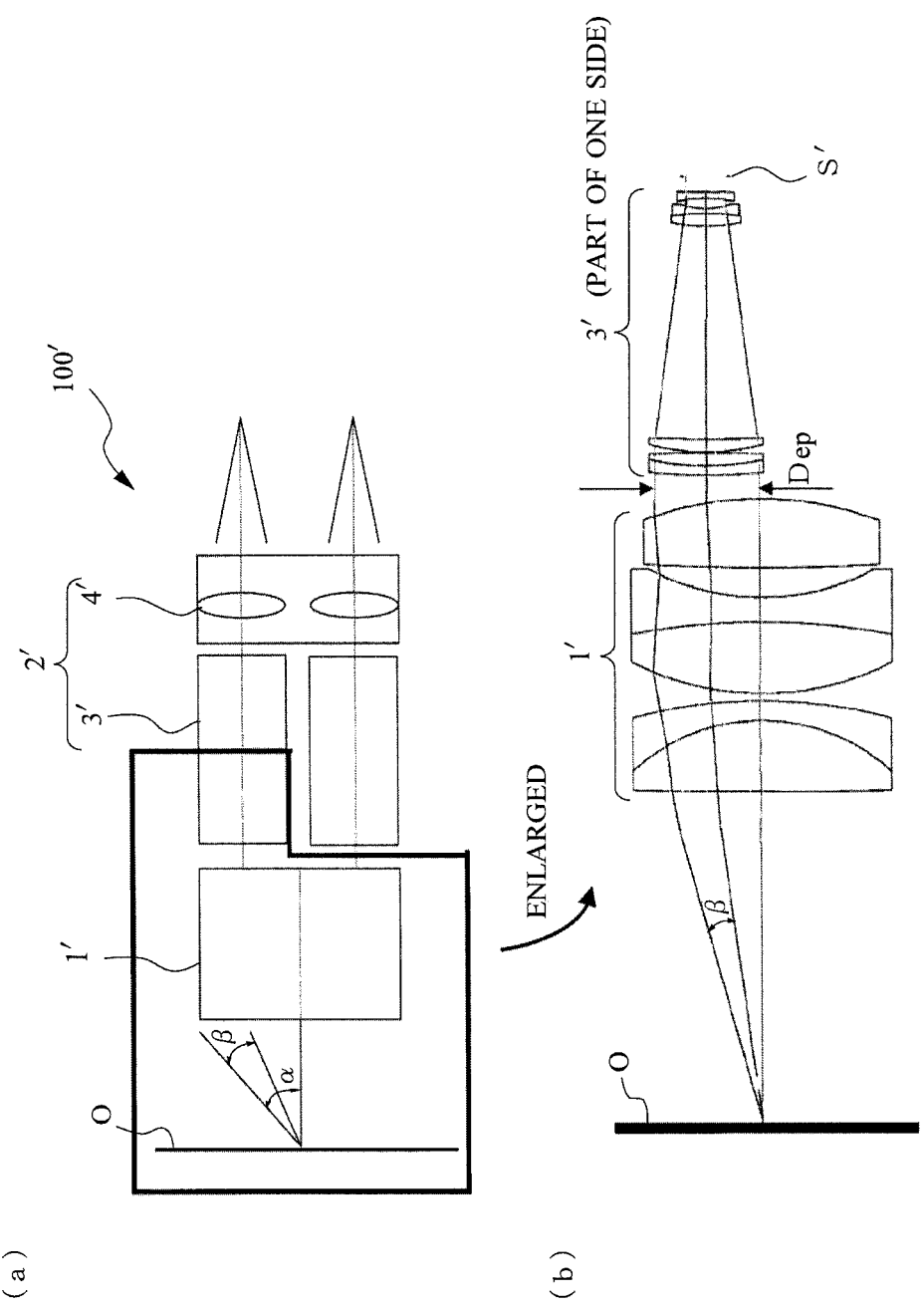

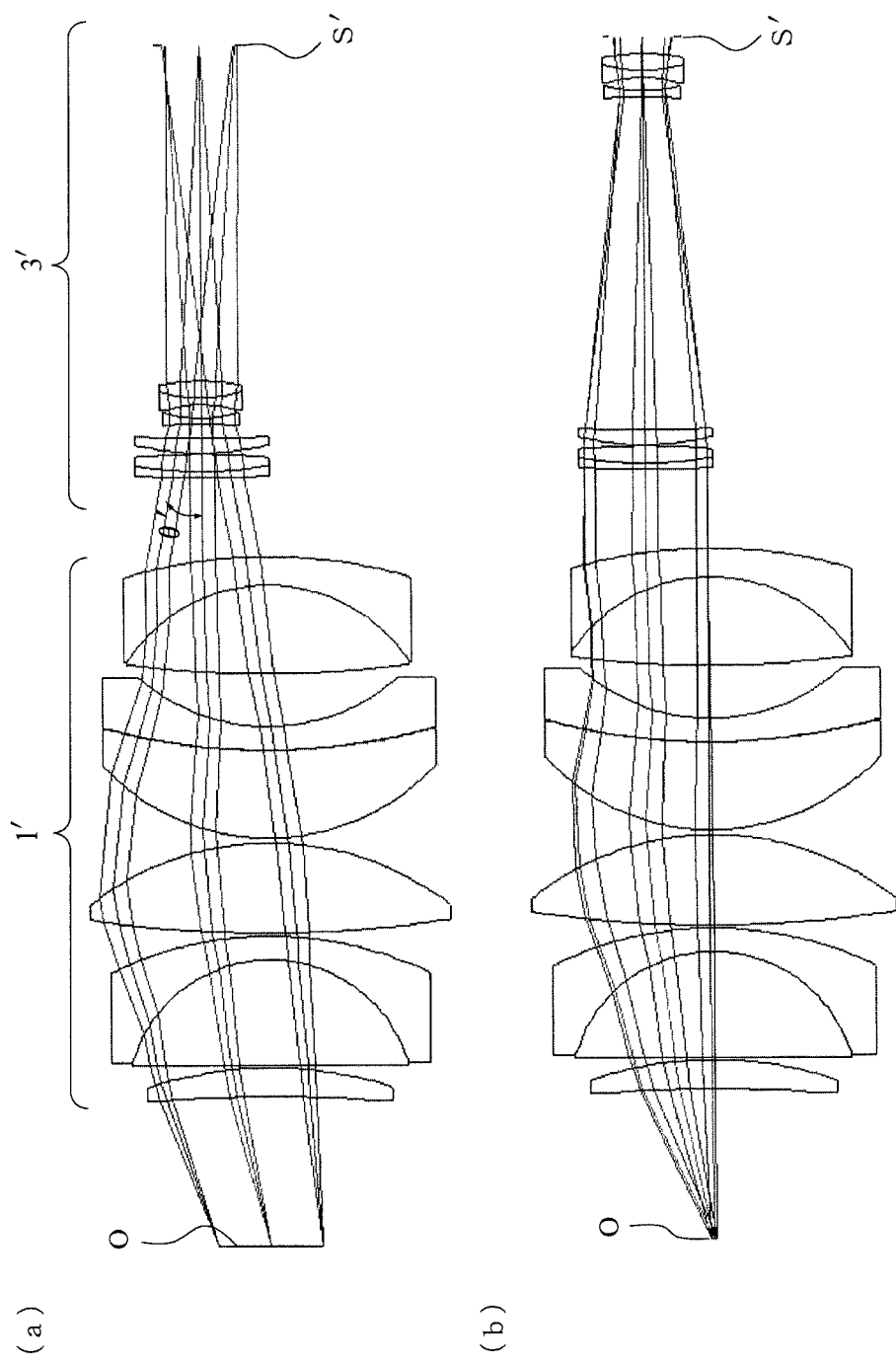

IMAGING OPTICAL SYSTEM, MICROSCOPE APPARATUS INCLUDING THE IMAGING OPTICAL SYSTEM, AND STEREOSCOPIC MICROSCOPE APPARATUS

CROSS REFERENCE TO RELATED APPLICATIONS

This application is a continuation of U.S. application Ser. No. 13/909,456, filed Jun. 4, 2013, pending, which is a divisional of U.S. application Ser. No. 13/190,733, filed Jul. 26, 2011, patented, which is a continuation application, filed under 35 U.S.C. § 111(a), of International Application PCT/JP2010/050872, filed Jan. 25, 2010, which claimed priority to Japanese Application No. 2009-018207 filed Jan. 29, 2009, Japanese Application No. 2009-061032 filed Mar. 13, 2009, Japanese Application No. 2009-095469 filed Apr. 10, 2009, Japanese Application No. 2009-138876 filed Jun. 10, 2009, Japanese Application No. 2009-178820 filed Jul. 31, 2009 and Japanese Application No. 2009-268501 filed Nov. 26, 2009, the disclosures of which are hereby incorporated by reference.

TECHNICAL FIELD

The present invention relates to an imaging optical system, a microscope apparatus including the imaging optical system, and a stereoscopic microscope apparatus.

BACKGROUND ART

A stereoscopic microscope apparatus as an example of a microscope apparatus can stereoscopically observe an object with protrusions and recesses as if the object is viewed by both eyes. Therefore, a distance relationship between a tool, such as tweezers, and an object can be easily recognized in an operation with the microscope. Thus, the microscope apparatus is particularly effective in a field that requires precise procedures, such as precision machinery industry and anatomy or surgery of living organisms. In such a stereoscopic microscope apparatus, an optical system of the luminous flux entering left and right eyes is at least partially separated to cause the optical axes to intersect over the surface of the object to obtain a parallax for stereoscopically observing the object. Enlarged images of the object viewed from different directions are created, and the images are observed through an eyepiece to stereoscopically view a minute object.

In the stereoscopic microscope apparatus, an example of a typical method for obtaining a stereoscopic vision includes a parallel stereoscopic microscope apparatus (parallel single-objective binocular microscope apparatus). As shown in FIG. 30(a), a parallel stereoscopic microscope apparatus 100' includes one objective lens 1' and two observation optical systems 2' for right eye and left eye arranged parallel to the optical axis of the objective lens 1'. Each of the observation optical systems 2' usually includes a variable power mechanism which will be called a variable power optical system 3' below. Each of the observation optical systems 2' also includes an imaging lens 4'.

In the parallel stereoscopic microscope apparatus 100', the objective lens 1' that has brought the focus position in line with the surface of the object plays a role of guiding the parallel luminous flux to the following variable power optical systems 3' for left and right eyes. The parallel luminous flux ejected from the objective lens 1' is divided into the two variable power optical systems 3' and is separately delivered to the left and right eyes. As shown in FIG. 30(b), each of the two variable power optical systems 3' is provided with a diaphragm S'. The position of the entrance pupil here is a position where a diaphragm image formed by a lens group in the variable power optical system 3' closer to an object O than the diaphragm S' is created. In the parallel stereoscopic microscope apparatus 100' with the configuration, the definition of the objective lens numerical aperture is different from that of a normal objective lens numerical aperture as shown in FIG. 30(a). More specifically, if the medium between the object O and the objective lens 1' is air, the normal objective lens numerical aperture is defined by sine of a half angle α of an angle of aperture of a luminous flux which is spread over the entire aperture of the objective lens 1' from the light ejected from a point on the optical axis of the object O. The objective lens numerical aperture in the parallel stereoscopic microscope apparatus 100' is defined by sine of a half angle β of an angle of aperture when the light ejected from a point on the optical axis of the object O is spread to the maximum diaphragm diameter of the diaphragm S' of one of the variable power optical systems 3'.

FIG. 30(b) is a diagram enlarging the objective lens 1' and part of the variable power optical system 3' of one side of FIG. 30(a). The light exited from the center of the surface of the object O enters the objective lens 1' to form a parallel luminous flux, and the parallel luminous flux enters the variable power optical system 3'. Since the objective lens 1' sufficiently satisfies the sine conditions, the parallel luminous flux diameter is twice the product of a focal length f obj of the objective lens and the objective lens numerical aperture sin β. The luminous flux needs to be guided to the variable power optical system 3' to exhibit the performance in accordance with the objective lens numerical aperture. Assuming that the effective diameter of the variable power optical system 3' is Dep, a relationship of the effective diameter Dep≥the parallel luminous flux diameter (=2·fobj·sin β) needs to be satisfied. In other words, the objective lens numerical aperture sin β in the parallel stereoscopic microscope apparatus 100' depends on the size of the effective diameter Dep of the variable power optical system 3'. As described, the stereoscopic microscope apparatus includes two optical paths for left eye and right eye for stereoscopic vision, and since the left and right optical paths are adjacent, the enlargement of the effective diameters Dep of the variable power optical systems 3' is synonymous with the enlargement of the distance between left and right optical axes of the variable power optical systems 3'. To put it plainly, it can be stated that the distance between the left and right optical axes of the variable power optical systems 3' determines the numerical aperture of the parallel stereoscopic microscope apparatus 100'. The variable power optical systems 3' are constituted as a focal variable power optical systems in which an entering luminous flux and an ejected luminous flux are parallel, and the imaging lenses 4' arranged subsequently form an image. The magnification of the a focal variable power optical system (hereinafter, called "a focal magnification") is calculated by dividing the parallel luminous flux diameter on the incident side by the parallel luminous flux diameter on the ejection side. The magnification of the image can be calculated by dividing a value f zoom, which is obtained by multiplying the focal length of the imaging lens 4' by the a focal magnification, by the focal length fobj of the objective lens 1'. In recent years, demand for a stereoscopic microscope apparatus capable of observing a wide variable power range by one apparatus is increasing along with the diversification of applications.

Consequently, a variable power optical system is proposed in which the variable power range is enlarged while the total length is controlled (for example, see Patent Literature 1).

CITATION LIST

Patent Literature

Patent Literature 1 Japanese Patent Laid-Open No. 2005-91755

SUMMARY OF INVENTION

Technical Problem

However, there is a problem that not only the variable power optical system, but also the objective lens is enlarged if the variable power range is enlarged to the low-power side. FIG. 31 shows optical path diagrams of the objective lens 1' and part of the variable power optical system 3' of one side. The variable power optical system 3' in two different states of magnification is connected to the same objective lens 1', and the diagrams are arranged above and below. FIG. 31($a$) shows a low-power end state, and FIG. 31($b$) shows a high-power end state. As is clear from FIG. 31, the position where the ray passes through the objective lens 1' is totally different during low-power and during high-power of the variable power optical system 3'. As described, the magnification is calculated by dividing the value fzoom, which is obtained by multiplying the focal length of the imaging lens by the afocal magnification, by the focal length fobj of the objective lens 1'. As is clear from the definition, the value fzoom needs to be reduced, or the focal length fobj of the objective lens 1' needs to be increased to enlarge the variable power range to the low-power side. However, the increase in the focal length fobj of the objective lens 1' leads to the enlargement of the objective lens 1', and the increase needs to be avoided. Consequently, the value fzoom is inevitably reduced. Assuming that an image height is y and a value obtained by multiplying the focal length of the imaging lens 4' by the afocal magnification is fzoom, an angle θ' of the ray ejected from the objective lens 1' and entering the variable power lens group 3' relative to the optical axis (shown in FIG. 31($a$)) is in accordance with y=fzoom·tan θ'. Since the size of the image is constant, θ' increases if fzoom is reduced. As is clear from FIG. 31($a$), the main cause of the enlargement of the objective lens 1' is a light flux with a large angle θ'. It can be recognized that the object O side of the objective lens 1' is particularly enlarged. Although only one example will be described here, the ray on the high-power side usually determines the size on the image side of the objective lens 1', and the ray on the low-power side determines the size on the objective side of the objective lens 1'. Particularly, the enlargement of the object O side of the objective lens 1' is disadvantageous in that the field of view of the surface of the object is hidden as seen from the user, and the enlargement needs to be avoided.

The present invention has been made in view of the problem, and an object of the present invention is to provide an imaging optical system capable of enlargement to a low-power range while avoiding the enlargement of the objective lens in a microscope apparatus that includes the objective lens and observation optical systems (imaging optical system as a whole), and another object of the present invention is to provide a microscope apparatus including the imaging optical system and a stereoscopic microscope apparatus.

Solution to Problem

To solve the problem, an imaging optical system according to the present invention is an imaging optical system that forms an image through an objective lens and an observation optical system and that is configured to be able to change the magnification of the image, characterized in that the observation optical system comprises a plurality of optical paths and ejects light from the objective lens from each of the plurality of optical paths, and each of the optical paths comprises a plurality of lens groups, in at least one of the plurality of optical paths, each of at least two lens groups among the plurality of lens groups moves in a direction including a component perpendicular to a reference optical axis of the observation optical system at at least part of a section where the magnification is changed from a high-power end state to a low-power end state, at least one of the lens groups that move in the direction including the component perpendicular to the reference optical axis of the observation optical system is a first correction lens group that moves so that a position of light passing outermost from an optical axis of the objective lens moves toward the optical axis of the objective lens compared with a case of moving in a direction including only a component substantially parallel to the reference optical axis, when the magnification is changed from the high-power end state to the low-power end state, and remaining lens groups of the lens groups that move in the direction including the component perpendicular to the reference optical axis of the observation optical system is a second correction lens group that corrects the optical paths changed by the first correction lens group.

Preferably, the imaging optical system is characterized in that the first correction lens group moves to reduce a distance between the optical axes of the lens groups in the plurality of optical paths, and the second correction lens group ejects the light so that the image is formed at an image forming position where the image would be formed when the plurality of lens groups are arranged so that each optical axis of the plurality of lens groups matches the reference optical axis.

Preferably, the imaging optical system is characterized in that the observation optical system comprises a diaphragm, and the diaphragm moves in the direction including the component perpendicular to the reference optical axis of the observation optical system at at least part of the section for changing the magnification from the low-power end state to the high-power end state.

Preferably, the diaphragm is characterized by moving following the lens groups that move in the direction including the component perpendicular to the reference optical axis, and a center of an exit pupil as an image of the diaphragm exists across the entire variable power range on the reference optical axis of the observation optical system.

Preferably, the imaging optical system is characterized in that the observation optical system comprises a diaphragm, and the diaphragm comprises, as an aperture section, the entire area where the luminous flux moved by the lens groups that move in the direction including the component perpendicular to the reference optical axis is swept at at least part of the section for changing the magnification from the low-power end state to the high-power end state.

Preferably, the aperture section of the diaphragm is characterized by being a precise circle including the entire area.

Preferably, the imaging optical system is characterized in that a light shielding unit is arranged at least on the optical axis side of the objective lens of the lens groups that move in the direction including the component perpendicular to the reference optical axis of the observation optical system, the light shielding unit blocking light passing through a space generated between the lens groups and the optical axis of the objective lens along with the movement of the lens groups in the direction perpendicular to the reference optical axis.

Preferably, the light shielding unit is characterized by being attached to connect each of the lens groups that move in the direction including the component perpendicular to the optical axis of the objective lens arranged on the plurality of optical paths and expands and contracts along with the movement in the direction including the component perpendicular to the reference optical axis of the lens groups.

Preferably, the light shielding unit is characterized by comprising: a first member formed by a member that blocks light, provided with an aperture that is penetrated in a parallel direction of the optical axis of the objective lens and that is in substantially the same size as the lens groups that move in the direction including the component perpendicular to the reference optical axis of the observation optical system, and held by setting, in the apertures, the lens groups that move in the direction including the component perpendicular to the reference optical axis of the observation optical system; and a second member formed by a member that blocks light, movable in the optical axis direction of the objective lens, holding the first member so that the first member can be moved in the direction perpendicular to the reference optical axis, and provided with aperture sections penetrated in the parallel direction of the optical axis of the objective lens, and the aperture sections of the second member are formed so that the lens groups are positioned in the aperture sections regardless of the movement of the lens groups that move in the direction including the component perpendicular to the reference optical axis.

Preferably, the first member is characterized by being formed to cover the portion other than the lens groups that move in the direction including the component perpendicular to the reference optical axis of the observation optical system in the aperture sections.

Preferably, the first member is characterized by including elastic members that expand and contract in accordance with the movement of the first member at both end portions in the direction perpendicular to the reference optical axis.

Preferably, the first member and the elastic members are characterized by being formed to cover the portion other than the lens groups that move in the direction including the component perpendicular to the reference optical axis of the observation optical system in the aperture sections.

Preferably, the imaging optical system is characterized in that the observation optical system comprises an afocal variable power optical system, and the afocal variable power optical system comprises the at least two lens groups.

Preferably, the imaging optical system is characterized in that the optical axes of the plurality of lens groups substantially coincide in the high-power end state.

Preferably, the imaging optical system is characterized in that the plurality of lens groups comprise: a first lens group arranged closest to the object and fixed during the change in the magnification; and a second lens group that is arranged on the image side of the first lens group and that is one of the lens groups that move in the direction including the component perpendicular to the reference optical axis, and the optical axis of the second lens group is decentered relative to the optical axis of the first lens group in the low-power end state.

Preferably, the imaging optical system is characterized in that the plurality of optical paths of the observation optical system comprises two optical paths for right eye and left eye.

A microscope apparatus according to the present invention is characterized by comprising: an illumination optical system that comprises a surface light emitter including a planar light emission area and that directs light radiated from the surface light emitter to an object; and any one of the imaging optical systems that comprises an objective lens and that collects light from the object to form an image of the object, wherein the surface light emitter is arranged at a position conjugate to an entrance pupil of the objective lens or near the position.

A microscope apparatus according to the present invention is characterized by comprising: any of the imaging optical systems that comprises an objective lens and that collects light from an object to form an image of the object; and an illumination optical system that collects light from a light source by an illumination lens to guide the light to an optical path of the imaging optical system and that directs the light to the object through the objective lens, wherein the illumination optical system is configured to move an image of the light source in accordance with an exit pupil moved by the lens groups moved in the direction including the component perpendicular to the reference optical axis of the observation optical system.

Preferably, the illumination optical system is characterized by steplessly and continuously moving the illumination lens in the direction including the component perpendicular to the optical axis.

Preferably, the illumination optical system is characterized by moving the illumination lens in the direction including the component perpendicular to the optical axis based on switching of at least two positions.

Preferably, the microscope apparatus is characterized in that the light source is steplessly, continuously, or based on switching of at least two positions, moved in the direction including the component perpendicular to the optical axis.

A microscope apparatus according to the present invention is characterized by comprising: any one of the imaging optical systems that comprises an objective lens and that collects light from an object to form an image of the object; and an illumination optical system that collects light from a light source by an illumination lens to guide the light to an optical path of the imaging optical system and that directs the light to the object through the objective lens, wherein the illumination optical system forms an image of the light source in a size including a trajectory of an exit pupil moved by the lens groups that move in the direction including the component perpendicular to the reference optical axis of the observation optical system.

A stereoscopic microscope apparatus according to the present invention is a stereoscopic microscope apparatus characterized by comprising: an objective lens; a plurality of afocal variable power optical systems that eject, as a plurality of parallel lights, a parallel light ejected substantially parallel to an optical axis of the objective lens from the objective lens; and a plurality of imaging lenses that collect the parallel lights ejected from the plurality of afocal variable power optical systems, wherein at least one of the plurality of afocal variable power optical systems comprises at least two lens groups that move in a direction including a component perpendicular to a reference optical axis of the afocal variable power optical systems at at least part of a section where the magnification is changed from a high-power end state to a low-power end state, at least one of the lens groups that move in the direction including the component perpendicular to the reference optical axis of the afocal variable power optical systems is a first correction lens group that moves so that a position of light passing outermost from an optical axis of the objective lens moves toward the optical axis of the objective lens compared with a case of moving in a direction including only a component substantially parallel to the reference optical axis, when the magnification is changed from the high-power end state to the low-power end state, and remaining lens groups of the lens groups that move in the direction including the component perpendicular to the reference optical axis of the afocal variable power optical systems is a second correction lens group that corrects the optical paths changed by the first correction lens group.

Preferably, the stereoscopic microscope apparatus is characterized by comprising an illumination optical system that comprises a surface light emitter including a planar light emission area and that directs light radiated from the surface light emitter to an object, wherein the surface light emitter is arranged at a position conjugate to an entrance pupil of the objective lens or near the position.

An imaging optical system according to the present invention is an imaging optical system that forms an image through an objective lens and an observation optical system and that is configured to be able to change the magnification of the image, characterized in that the observation optical system comprises a plurality of lens groups, and each of at least two lens groups among the plurality of lens groups moves in a direction including a component perpendicular to a reference optical axis of the observation optical system at at least part of a section where the magnification is changed from a high-power end state to a low-power end state, when an amount of movement in a direction perpendicular to the reference optical axis of the observation optical system, in which a direction from the reference optical axis of the observation optical system to an optical axis of the objective lens is defined as negative, in a plane including the optical axis of the objective lens and the reference optical axis of the observation optical system is expressed as a function of a position, which is on the reference optical axis of the observation optical system of the lens group arranged closest to the objective lens among the lens groups moved during the change in the magnification and in which a direction for moving from the low-power end state to the high-power end side is defined as positive, at least one lens group arranged closest to the objective lens among the at least two lens groups moves so that a first derivative of the function is 0 or more and a second derivative of the function is 0 or less at at least part of the section for changing the magnification when the magnification is changed from the low-power end state to the high-power end state.

Preferably, the imaging optical system is characterized in that an incident position of a principal ray with a largest angle relative to the reference optical axis of the observation optical system among the principal rays entering the observation optical system in a tangent plane of a plane of the observation optical system closest to the object is changed so that the position approaches the reference optical axis side of the observation optical system at least up to a predetermined focal length state when the magnification is changed from the low-power end state to the high-power end state.

Preferably, the imaging optical system is characterized in that the observation optical system comprises a plurality of optical paths and ejects light from the objective lens from each of the plurality of optical paths, and each of the optical paths comprises the plurality of lens groups, at least one of the lens groups that move in the direction including the component perpendicular to the reference optical axis of the observation optical system is a first correction lens group that moves to reduce a distance between the optical axes of the lens groups in the plurality of optical paths when the magnification is changed from the high-power end state to the low-power end state, and remaining lens groups of the lens groups that move in the direction including the component perpendicular to the reference optical axis of the observation optical system are second correction lens groups that correct the optical paths changed by the first correction lens group to eject the light so that the image is formed at an image forming position where the image would be formed when the plurality of lens groups are arranged so that optical axes of the plurality of lens groups match.

Preferably, the imaging optical system is characterized in that the observation optical system comprises an afocal variable power optical system, and the afocal variable power optical system comprises the at least two lens groups.

Preferably, the imaging optical system is characterized in that the optical axes of the plurality of lens groups substantially coincide in the high-power end state.

Preferably, the imaging optical system is characterized in that the plurality of lens groups comprise: a first lens group arranged closest to the object and fixed during the change in the magnification; and a second lens group that is arranged on the image side of the first lens group and that is one of the lens groups that move in the direction including the component perpendicular to the reference optical axis of the observation optical system, and the optical axis of the second lens group is decentered relative to the optical axis of the first lens group in the low-power end state.

Preferably, the imaging optical system is characterized in that the plurality of optical paths of the observation optical system comprises two optical paths for right eye and left eye.

A microscope apparatus according to the present invention is characterized by comprising any one of the imaging optical system.

A stereoscopic microscope apparatus according to the present invention is a stereoscopic microscope apparatus characterized by comprising: an objective lens; a plurality of afocal variable power optical systems that each eject a parallel light ejected substantially parallel to an optical axis of the objective lens from the objective lens to be a plurality of parallel lights; and a plurality of imaging lenses that collect the parallel lights ejected from the plurality of afocal variable power optical systems, wherein at least one of the plurality of afocal variable power optical systems comprises at least two lens groups that move in a direction including a component perpendicular to a reference optical axis of the afocal variable power optical systems at at least part of a section where the magnification is changed from a low-power end state to a high-power end state, when an amount of movement in a direction perpendicular to the reference optical axis of the afocal variable power optical systems, in which a direction from the reference optical axis of the afocal variable power optical systems to an optical axis of the objective lens is defined as negative, in a plane including the optical axis of the objective lens and the reference optical axis of the afocal variable power optical systems is expressed as a function of a position, which is on the reference optical axis of the afocal variable power optical systems of the lens group arranged closest to the objective lens among the lens groups moved during the change in the magnification and in which a direction for moving from the low-power end state to the high-power end side is defined as positive, at least one lens group arranged closest to the objective lens among the at least two lens groups moves so that a first derivative of the function is 0 or more and a second derivative of the function is 0 or less at at least part of the section for changing the magnification when the magnification is changed from the low-power end state to the high-power end state.

An imaging optical system according to the present invention is an imaging optical system that forms an image through an objective lens and an observation optical system and that is configured to be able to change the magnification of the image, characterized in that the observation optical system comprises a plurality of lens groups and a diaphragm, and each of at least two lens groups among the plurality of lens groups moves in a direction including a component perpendicular to a reference optical axis of the observation optical system at at least part of a section where the magnification is changed from a low-power end state to a high-power end state, and the diaphragm moves following the lens groups that move in the direction including the component perpendicular to the reference optical axis of the observation optical system, and a center of an exit pupil as an image of the diaphragm exists across the entire variable power range on the reference optical axis of the observation optical system.

An imaging optical system according to the present invention is an imaging optical system that forms an image through an objective lens and an observation optical system and that is configured to be able to change the magnification of the image, characterized in that the observation optical system comprises a plurality of lens groups and a diaphragm, and each of at least two lens groups among the plurality of lens groups moves in a direction including a component perpendicular to a reference optical axis of the observation optical system at at least part of a section where the magnification is changed from a low-power end state to a high-power end state, and the diaphragm comprises, as an aperture section, the entire area where the luminous flux moved by the lens groups that move in the direction including the component perpendicular to the reference optical axis of the observation optical system is swept.

Preferably, the imaging optical system is characterized in that the aperture section of the diaphragm is a precise circle including the entire area.

Preferably, the imaging optical system is characterized in that the observation optical system comprises a plurality of optical paths and ejects light from the objective lens from each of the plurality of optical paths, and each of the optical paths comprises the plurality of lens groups, at least one of the lens groups that move in the direction including the component perpendicular to the reference optical axis of the observation optical system is a first correction lens group that moves to reduce a distance between the optical axes of the lens groups in the plurality of optical paths when the magnification is changed from the high-power end state to the low-power end state, and remaining lens groups of the lens groups that move in the direction including the component perpendicular to the reference optical axis of the observation optical system are second correction lens groups that correct the optical paths changed by the first correction lens group to eject the light so that the image is formed at an image forming position where the image would be formed when the plurality of lens groups are arranged so that optical axes of the plurality of lens groups match.

Preferably, the imaging optical system is characterized in that the observation optical system comprises an afocal variable power optical system, and the afocal variable power optical system comprises the at least two lens groups.

Preferably, the imaging optical system is characterized in that the optical axes of the plurality of lens groups and the center of the diaphragm substantially coincide in the high-power end state.

Preferably, the imaging optical system is characterized in that the plurality of lens groups comprise: a first lens group arranged closest to the object and fixed during the change in the magnification; and a second lens group that is arranged on the image side of the first lens group and that is one of the lens groups that move in the direction including the component perpendicular to the reference optical axis of the observation optical system, and the optical axis of the second lens group is decentered relative to the optical axis of the first lens group in the low-power end state.

Preferably, the imaging optical system is characterized in that the plurality of optical paths of the observation optical system comprises two optical paths for right eye and left eye.

A microscope apparatus according to the present invention is characterized by comprising any one of the imaging optical system.

A stereoscopic microscope apparatus according to the present invention is a stereoscopic microscope apparatus characterized by comprising: an objective lens; a plurality of afocal variable power optical systems that each eject a parallel luminous flux ejected substantially parallel to an optical axis of the objective lens from the objective lens to be a plurality of parallel luminous flux; and a plurality of imaging lenses that collect the parallel luminous flux ejected from the plurality of afocal variable power optical systems, wherein at least one of the plurality of afocal variable power optical systems comprises at least two lens groups and a diaphragm, the at least two lens groups move in a direction including a component perpendicular to a reference optical axis of the afocal variable power optical systems at at least part of a section where the magnification is changed from a low-power end state to a high-power end state, and the diaphragm moves following the lens groups that move in the direction including the component perpendicular to the reference optical axis of the afocal variable power optical systems, and a center of an exit pupil as an image of the diaphragm exists across the entire variable power range on the reference optical axis of the afocal variable power optical systems.

A stereoscopic microscope apparatus according to the present invention is a stereoscopic microscope apparatus characterized by comprising: an objective lens; a plurality of afocal variable power optical systems that each eject a parallel luminous flux ejected substantially parallel to an optical axis of the objective lens from the objective lens to be a plurality of parallel luminous flux; and a plurality of imaging lenses that collect the parallel luminous flux ejected from the plurality of afocal variable power optical systems, wherein at least one of the plurality of afocal variable power optical systems comprises at least two lens groups and a diaphragm, the at least two lens groups move in a direction including a component perpendicular to a reference optical axis of the afocal variable power optical systems at at least part of a section where the magnification is changed from a low-power end state to a high-power end state, and the diaphragm comprises, as an aperture section, the entire area where the luminous flux moved by the lens groups that move in the direction including the component perpendicular to the reference optical axis of the afocal variable power optical systems is swept.

An imaging optical system according to the present invention is an imaging optical system that forms an image through an objective lens and an observation optical system and that is configured to be able to change the magnification of the image, characterized in that the observation optical system comprises a plurality of optical paths and ejects light from the objective lens from each of the plurality of optical paths, and each of the optical paths comprises a plurality of lens groups, in at least one of the plurality of optical paths, each of at least two lens groups among the plurality of lens groups moves in a direction including a component perpendicular to a reference optical axis of the observation optical system at at least part of a section where the magnification is changed from a high-power end state to a low-power end state, and a light shielding unit is arranged at least on the optical axis side of the objective lens of the lens groups that move in the direction including the component perpendicular to the reference optical axis of the observation optical system, the light shielding unit blocking light passing through a space generated between the lens groups and the optical axis of the objective lens along with the movement of the lens groups in the direction perpendicular to the reference optical axis.

Preferably, the imaging optical system is characterized in that the light shielding unit is attached to connect each of the lens groups that move in the direction including the component perpendicular to the reference optical axis of the observation optical system arranged on the plurality of optical paths and expands and contracts along with the movement in the direction including the component perpendicular to the reference optical axis of the lens groups.

Preferably, the imaging optical system is characterized in that the light shielding unit comprises: a first member formed by a member that blocks light, provided with an aperture that is penetrated in a parallel direction of the optical axis of the objective lens and that is in substantially the same size as the lens groups that move in the direction including the component perpendicular to the reference optical axis of the observation optical system, and held by setting, in the apertures, the lens groups that move in the direction including the component perpendicular to the reference optical axis of the observation optical system; and a second member formed by a member that blocks light, movable in the optical axis direction of the objective lens, holding the first member so that the first member can be moved in the direction perpendicular to the reference optical axis, and provided with aperture sections penetrated in the parallel direction of the optical axis of the objective lens, and the aperture sections of the second member are formed so that the lens groups are positioned in the aperture sections regardless of the movement of the lens groups that move in the direction including the component perpendicular to the reference optical axis.

Preferably, the imaging optical system is characterized in that the first member is formed to cover the portion other than the lens groups that move in the direction including the component perpendicular to the reference optical axis of the observation optical system in the aperture sections.

Preferably, the imaging optical system is characterized in that the first member includes elastic members that expand and contract in accordance with the movement of the first member at both end portions in the direction perpendicular to the reference optical axis.

Preferably, the imaging optical system is characterized in that the first member and the elastic members are formed to cover the portion other than the lens groups that move in the direction including the component perpendicular to the reference optical axis of the observation optical system in the aperture sections.

Preferably, the imaging optical system is characterized in that the observation optical system comprises an afocal variable power optical system, and the afocal variable power optical system comprises the at least two lens groups.

Preferably, the imaging optical system is characterized in that the optical axes of the plurality of lens groups substantially coincide in the high-power end state.

Preferably, the imaging optical system is characterized in that the plurality of lens groups comprise: a first lens group arranged closest to the object and fixed during the change in the magnification; and a second lens group that is arranged on the image side of the first lens group and that is one of the lens groups that move in the direction including the component perpendicular to the reference optical axis, and the optical axis of the second lens group is decentered relative to the optical axis of the first lens group in the low-power end state.

Preferably, the imaging optical system is characterized in that the plurality of optical paths of the observation optical system comprises two optical paths for right eye and left eye.

A microscope apparatus according to the present invention is characterized by comprising any one of the imaging optical system.

A stereoscopic microscope apparatus according to the present invention is a stereoscopic microscope apparatus characterized by comprising: an objective lens; a plurality of afocal variable power optical systems that each eject a parallel light ejected substantially parallel to an optical axis of the objective lens from the objective lens to be a plurality of parallel lights; and a plurality of imaging lenses that collect the parallel lights ejected from the plurality of afocal variable power optical systems, wherein at least one of the plurality of afocal variable power optical systems comprises at least two lens groups that move in a direction including a component perpendicular to the optical axis of the objective lens at at least part of a section where the magnification is changed from a high-power end state to a low-power end state, a light shielding unit is arranged at least on the optical axis side of the objective lens of the lens groups that move in the direction including the component perpendicular to the optical axis of the objective lens, the light shielding unit blocking light passing through a space generated between the lens groups and the optical axis of the objective lens along with the movement of the lens groups in the direction perpendicular to the optical axis of the objective lens.

Advantageous Effects of Invention

If the imaging optical system, the microscope apparatus, and the stereoscopic microscope apparatus according to the present invention are configured as described above, the enlargement of the objective lens can be prevented, and the enlargement to the low-power range is possible.

BRIEF DESCRIPTION OF DRAWINGS

FIG. 1 is a perspective view showing an appearance of a parallel stereoscopic microscope apparatus.

FIG. 2 is an explanatory view showing a configuration of an optical system of the microscope apparatus.

FIG. 3 shows lens cross-sectional views indicating an imaging optical system of the parallel stereoscopic microscope apparatus, (a) showing a low-power end state, (b) showing a high-power end state.

FIG. 4 shows lens cross-sectional views indicating a variable power optical system, (a) showing a low-power end state, (b) showing a medium power state, and (c) showing a high-power end state.

FIG. 5 shows explanatory views indicating arrangements of lens groups constituting the variable power optical system at a low-power end and a high-power end according to a first example, (a) showing a low-power end state when a third lens group serves as a second correction lens group, (b) showing a low-power end state when a fourth lens group serves as the second correction lens group, (c) showing a high-power end state.

FIG. 6 shows explanatory views indicating arrangements of the lens groups constituting the variable power optical system at the low-power end and the high-power end according to a second example, (a) indicating a low-power end state when the third lens group serves as the second correction lens group, (b) indicating a low-power end state when the fourth lens group serves as the second correction lens group, and (c) indicating a high-power end state.

FIG. 7 shows explanatory views indicating arrangements of the lens groups constituting the variable power optical system at the low-power end and the high-power end according to a third example, (a) showing a low-power end state when the third lens group serves as the second correction lens group, (b) showing a low-power end state when the fourth lens group serves as the second correction lens group, (c) showing a low-power end state when a fifth lens group serves as the second correction lens group, and (d) showing a high-power end state.

FIG. 8 shows explanatory views indicating arrangements of the lens group constituting the variable power optical system at the low-power end and the high-power end according to a fourth example, (a) showing a low-power end state when the third lens group serves as the second correction lens group, (b) showing a low-power end state when the fourth lens group serves as the second correction lens group, (c) showing a case in which the fifth lens group serves as the second correction lens group, (d) showing a high-power end state.

FIG. 9 is a graph showing a relationship between an amount of movement in an optical axis direction of the second lens group in which a moving direction to the image side is defined as positive and an entrance pupil position in which a direction away from an object-side vertex of the first lens group (vertex of an object-side surface of a lens positioned closest to the object side) is defined as positive.

FIG. 10 is a graph showing a relationship between the amount of movement in the optical axis direction of the second lens group, in which the moving direction to the image side is defined as positive, and tangent of a principal ray incidence angle entering the variable power optical system.

FIG. 11 shows explanatory views indicating relationships between the variable power optical system and the principal ray, (a) showing the principal ray incidence angle, (b) showing a principal ray incidence height.

FIG. 12 is a graph showing a relationship between the amount of movement in the optical axis direction of the second lens group, in which the moving direction to the image side is defined as positive, and the principal ray incidence height.

FIG. 13 shows explanatory views for explaining the principal ray and the principal ray incidence height, (a) showing a low-power end state when the second and third lens groups are not decentered, (b) showing a low-power end state when the second and third lens groups are decentered.

FIG. 14 is a graph showing a trajectory of the second lens group of the variable power optical system.

FIG. 15 is a graph showing a relationship of the principal ray incidence height relative to the amount of movement in the optical axis direction of the second lens group.

FIG. 16 shows explanatory views explaining an eye point decentered by decentering of the second correction lens group, (a) showing a state in which the second correction lens group is not decentered, (b) showing a state in which the second correction lens group is decentered, (c) showing a state in which the decentering of the eye point based on the decentering of the second correction lens group is corrected by decentering of a diaphragm.

FIG. 17 is an explanatory diagram for explaining a diaphragm including an aperture section that includes the entire area in which the diaphragm decentered by the decentering of the second correction lens group moves.

FIG. 18 is an explanatory diagram for explaining another embodiment in relation to a diaphragm including an aperture section that includes the entire area in which the diaphragm decentered by the decentering of the second correction lens group moves.

FIG. 19 shows cross-sectional views of the optical system indicating from a conjugate image of an entrance pupil to the diaphragm of the imaging optical system of the parallel stereoscopic microscope apparatus, (a) showing a low-power end state of a normal stereoscopic microscope apparatus, (b) showing a high-power end state of the stereoscopic microscope, (c) showing a low-power end state of a stereoscopic microscope apparatus configured to move part of the lens groups of the variable power optical system to reduce the distance between the optical axes on the low-power side.

FIG. 20 is an explanatory view showing a configuration of the stereoscopic microscope apparatus when a coaxial epi-illumination apparatus is inserted between the objective lens and the observation optical system.

FIG. 21 is an explanatory view showing a configuration of the stereoscopic microscope apparatus when the coaxial epi-illumination apparatus is inserted between the variable power optical system and the imaging lens group inside the observation optical system.

FIG. 22 is an explanatory view showing a configuration of an optical system of the coaxial epi-illumination apparatus.

FIG. 23 is an explanatory view showing a trajectory of a ray in the optical system.

FIG. 24 is a schematic diagram of the stereoscopic microscope apparatus including light shielding units according to a first example.

FIG. 25 shows explanatory views indicating arrangements of the lens group constituting the light shielding units and the variable power optical system at the low-power end and the high-power end according to the first example, (a) showing a high-power end state, (b) showing a low-power end state.

FIG. 26 is a schematic diagram of the stereoscopic microscope apparatus including the light shielding units according to a second example.

FIG. 27 shows explanatory views indicating arrangements of the lens group constituting the light shielding units and the variable power optical system at the low-power end and the high-power end according to the second example, (a) showing a high-power end state, (b) showing a low-power end state.

FIG. 28 shows diagrams indicating configurations of the light shielding units and a movable group of the variable power optical system according to the second example, (a) showing a high-power end state, (b) showing a low-power end state.

FIG. 29 shows diagrams indicating configurations of the light shielding units and the movable group of the variable power optical system according to a modified example of the second example, (a) showing a high-power end state, and (b) showing a low-power end state.

FIG. 30 shows explanatory views for explaining an objective lens numerical aperture of the parallel stereoscopic microscope apparatus, (a) showing the entire optical system of the microscope apparatus, (b) showing an enlarged state of main parts.

FIG. 31 shows cross-sectional views of an optical system of a conventional parallel stereoscopic microscope apparatus, (a) showing a low-power end state, (b) showing a high-power end state.

DESCRIPTION OF EMBODIMENTS

Hereinafter, preferred embodiments of the present invention will be described with reference to the drawings. A configuration of a parallel stereoscopic microscope apparatus 100 as an example of a microscope apparatus will be described using FIGS. 1 and 2. The parallel stereoscopic microscope apparatus 100 is a microscope apparatus with a single-objective binocular configuration, and an optical system of the parallel stereoscopic microscope apparatus 100 includes: an imaging optical system 5 that collects light illuminated by a transmitted illumination apparatus not shown and transmitted through an object O to form a first image IM of the object O; and eyepieces 6 for enlarging and observing the first image IM formed by the imaging optical system 5. The imaging optical system 5 includes: an objective lens 1 that collects light from the object O to convert the light into a luminous flux substantially parallel to an optical axis; variable power optical systems 3 that change an observation magnification (change the magnification) of an image of the object O; and imaging lenses 4 that collect the light ejected from the variable power optical systems 3 to form the first image IM. Optical systems including the variable power optical systems 3 and the imaging lenses 4 will be called observation optical systems 2, and the microscope apparatus 100 includes: two observation optical systems 2 in which the optical axes extend parallel to each other; and two eyepieces 6.

The stereoscopic microscope apparatus 100 includes: a base unit (illumination unit) 101 including a transmitted illumination apparatus; a variable power lens barrel 103 provided with the objective lens 1 and the eyepieces 6 and including the variable power optical systems 3 inside; and a focusing apparatus 105. A sample platform 102 embedded with a transparent member is provided on the upper surface of the base unit 101. The objective lens 1 is attached to an objective lens attachment unit 106 provided below the variable lens barrel 103. In the objective lens attachment unit 106, one of a plurality of predetermined low-power objective lenses and high-power objective lenses can be selected and attached in some cases, and a plurality of lenses among the plurality of predetermined low-power objective lenses and high-power objective lenses are selected and attached in other cases.

The variable power optical systems 3 for left eye and right eye are arranged inside the variable power lens barrel 103, and a variable power knob 107 is arranged outside the variable power lens barrel 103. The variable power optical systems 3 include movable lens groups, and as the variable power knob 107 is rotated, the movable lens groups move in an optical axis direction in accordance with a predetermined amount of movement. The variable power optical systems 3 include adjustable diaphragms, and an adjustment mechanism (not shown) of the adjustable diaphragms is arranged in the variable power lens barrel 103. The focusing apparatus 105 includes a focusing knob 108 and a mechanism unit (not shown) that vertically moves the variable power lens barrel 103 along the optical axis along with the rotation of the focusing knob 108. Binocular lens barrels 104 including imaging lenses 4 and eyepieces 6 are attached above the variable power lens barrel 103. The imaging lenses 4 arranged on the left and right collect the parallel light exited from the variable power optical systems 3 for left and right eyes to temporarily form the first image IM of the object, and the eyepieces 6 attached to upper end sections of the binocular lens barrels 104 can be used to observe the formed first image IM by left and right naked eyes.

In the case illustrated in FIGS. 3 and 4, the variable power optical system 3 includes four lens groups in total, a first lens group G1 having positive refractive power, a second lens group G2 having negative refractive power, a third lens group G3 having positive refractive power, and a fourth lens group G4 having negative refractive power, in order from the object O side. In the variable power optical system 3, the second lens group G2 moves in a certain direction from the object side to the image side, and the third lens group G3 moves in a certain direction from the image side to the object side during the change in the magnification from the low-power end state to the high-power end state. Therefore, the second lens group G2 and the third lens group G3 are configured to always move in certain directions only and not to move in reverse directions in the middle of the change in the magnification. A diaphragm S is arranged between the second lens group G2 and the third lens group G3.

In the stereoscopic microscope apparatus 100, as described using FIG. 31, the maximum diameter of the light passing through the objective lens 1 when the variable power optical system 3 is in a low-power end state is greater than the maximum diameter of the light passing through the objective lens 1 in a high-power end state. More specifically, a peripheral part of the lens constituting the objective lens 1 is not used during high-power and is only used during low-power. On the other hand, the maximum diameter of the light entering the variable power optical system 3 when the variable power optical system 3 is in the high-power end state is greater than the maximum diameter of the light entered in the low-power end state. Therefore, in the microscope apparatus 100 according to the present embodiment, the entrance pupil is brought close to the optical axis of the objective lens 1 to reduce the diameter of the luminous flux passing through the objective lens 1 on the low-power end side. In other words, as shown in FIG. 3, at least one of the lens groups constituting the variable power optical system 3 is moved in a direction including a component perpendicular to the optical axis during the change in the magnification (hereinafter, the lens group will be called a "first correction lens group CG1"). More specifically, the optical axis of the first correction lens group CG1 is decentered relative to an optical axis as a reference of the power optical system 3 (for example, an optical axis of a lens group (for example, the first lens group G1) fixed during the change in the magnification among the lens groups included in the variable power optical system 3, and the optical axis will be called a "reference optical axis A"). The first correction lens group CG1 may be at least one of the lens groups for which the magnification is changed by the movement along the optical axis during the change in the magnification, the first correction lens group CG1 may be at least one of the lens groups not moved along the optical axis during the change in the magnification, or the first correction lens group CG1 may be both. In FIGS. 3 and 4, the second lens group G2 for which the magnification is changed by the movement along the optical axis during the change in the magnification serves as the first correction lens group CG1.

As described, FIG. 3 shows the objective lens 1 and the variable power lens group 3 of one side arranged on the optical paths for left and right eyes (observation optical systems 2). In the variable power lens group 3, some of the lens groups on the object O side (the first lens group G1 fixed during the change in the magnification and the second lens group G2 moved during the change in the magnification) are illustrated. In this zoom type, as shown in FIG. 4(a), the second lens group G2 (the first correction lens group CG1) is moved to the object side when the magnification is changed to the low-power end side (when the magnification is changed), and the second lens group G2 is decentered so that the optical axis of the second lens group G2 is positioned at a position deviated from the reference optical axis A. More specifically, the first correction lens group CG1 (second lens group G2) is moved to reduce the distance between the optical axes of the left and right variable power optical systems 3 (bring close to the optical axis of the objective lens 1). The left and right pupils are brought close to the optical axis of the objective lens 1 by moving the first correction lens group CG1 during the change in the magnification. Therefore, the ray at the peripheral part among the rays passing through the objective lens 1 approaches the optical axis of the objective lens 1. As a whole, the maximum diameter of the light passing through the objective lens 1 is reduced, and the diameter of the objective lens 1 is reduced and miniaturized. In other words, even if the low-power range is enlarged, this can be realized by the size of the diameter of the conventional objective lens. The maximum diameter of the light entering the variable power optical system 3 is smaller during low-power than during high-power. Therefore, even if the first correction lens group CG1 (second lens group G2) is decentered, the luminous flux can be set within the lens effective diameter (maximum diameter that the light can enter) of the first lens group G1. In the present embodiment, the first lens group G1 and the fourth lens group G4 are fixed in a power changing operation.

It is desirable in the microscope apparatus 100 that the variable power optical system 3 is an afocal variable power optical system that changes the magnification of the diameter of the entered parallel luminous flux to eject the flux as a parallel luminous flux (afocal luminous flux). Therefore, to ultimately cause the variable power optical system 3 to eject the afocal luminous flux, the deviation of the ejected luminous flux from the parallel luminous flux after the change in the optical path in the variable power optical system 3 caused by the decentering of the second lens group G2 (first correction lens group CG1) needs to be corrected by moving at least one of the other lens groups in the direction including a component perpendicular to the optical axis (the lens group will be called a "second correction lens group CG2"). More specifically, the second correction lens group CG2 needs to be decentered to correct the optical path changed by the first correction lens group CG1 to eject light to form an image at an image forming position where the image would be formed when lens groups constituting the variable power optical system 3 are arranged to match the optical axes. In the variable power optical system 3 shown in FIG. 4, the third lens group G3 with positive refractive power is used as the second correction lens group CG2. Therefore, in the low-power end state, the third lens group G3 is decentered in the same direction as the second lens group G2 relative to the reference optical axis A (optical axis of the first lens group G1). The amount of decentering of the third lens group G3 can be uniquely determined from the amount of decentering of the second lens group G2. When the fourth lens group G4 with negative refractive power is set as the second correction lens group CG2, decentering in the opposite direction of the second lens group G2 is needed. The second correction lens group CG2 may be at least one of the lens groups for which the magnification is changed by the movement along the optical axis during the change in the magnification, may be at least one of the lens groups not moved along the optical axis during the change in the magnification, or may be both.

The diameter of the luminous flux entering the variable power optical system 3 is the largest during the highest power. Therefore, as shown in FIG. 4(c), it is desirable that the optical axes of all lens groups included in the variable power optical system 3 (first to fourth lens groups G1 to G4) substantially coincide (substantially coincide with the reference optical axis A) to effectively use the entrance pupil of the variable power optical system 3 during the highest power of the variable power optical system 3.

The variable power optical system 3 shown in FIG. 3 illustrates a case in which the first lens group G1 has positive refractive power, and the second lens group G2 (first correction lens group CG1) has negative refractive power. Subsequently, there is a continuation to the lens groups, the imaging lens, and the eyepiece following the third lens group not shown in FIG. 3 in the variable power optical system 3, and the image is observed by the left eye and the right eye. The optical path diagrams shown in FIG. 3 illustrate configurations with substantially the same numerical apertures as the conventional optical system shown in FIG. 31. As described, during the highest power of the variable power optical system 3 shown in FIG. 3(b), it is desirable that the optical axes of all lens groups match (on the line parallel to the optical axis of the objective lens 1) to effectively use the entrance pupil of the variable power optical system 3. Therefore, the optical path diagram is the same as FIG. 31(b). The following Table 1 shows data of the objective lens 1 shown in FIG. 3. In Table 1, m denotes a plane number of an optical plane counted from the object O side, r denotes a radius of curvature of each optical plane, d denotes a distance (spacing) on the optical axis from each optical plane to the next optical plane, nd denotes a reflective index relative to a d line, and vd denotes an Abbe number. In the following Table 1, a refractive index 1.00000 of air is not indicated. A unit "mm" is usually used for the radius of curvature, the spacing, and other lengths described in all data below. However, a similar optical performance of the optical system can be obtained after proportional enlargement or proportional reduction, and the unit is not limited to this (the same applies to the following data tables).

TABLE 1

| m | r | d | nd | vd |
|---|---|---|---|---|
| 1 | −249.743 | 4.900 | 1.49782 | 82.50 |
| 2 | −66.680 | 0.500 | | |
| 3 | −1600.580 | 17.900 | 1.43426 | 94.85 |
| 4 | −24.560 | 4.000 | 1.71300 | 53.87 |
| 5 | −62.490 | 0.500 | | |

TABLE 1-continued

| m | r | d | nd | vd |
|---|---|---|---|---|
| 6 | 206.782 | 15.400 | 1.49782 | 82.50 |
| 7 | −49.681 | 0.800 | | |
| 8 | 38.548 | 15.150 | 1.43426 | 94.85 |
| 9 | 107.188 | 4.000 | 1.51680 | 64.11 |
| 10 | 33.123 | 9.050 | | |
| 11 | 188.057 | 15.100 | 1.56907 | 71.31 |
| 12 | −28.609 | 4.900 | 1.73400 | 51.47 |
| 13 | −85.550 | | | |

In the microscope apparatus 100 with the configuration, the distance between the optical axes of the pair of variable power optical systems 3 arranged after the ejection from the objective lens 1 is about 16 mm at the lowest power, and if the amount of decentering of the second lens group G2 (first correction lens group CG1) is 3 mm, the distance between the optical axes is about 22 mm at the highest power. In this way, it can be recognized from FIG. 3 that the objective lens 1 is miniaturized while the same variable power range is maintained.

Examples of Variable Power Optical System

Hereinafter, specific examples of configurations of the variable power optical system 3 according to the present embodiment will be described. Although the lens actually has a thickness, only the behavior of the ray entering the lens and the ray ejected from the lens can be considered as an effect of the lens, and a replacement to a thin lens with a thickness that can be ignored is theoretically possible. Particularly, since the number of lens groups is small in the variable power optical system, approximation to the thin lens is easy. It is typical to replace the lens groups by thin lenses to determine the optimal focal length and the arrangement of the lens groups in accordance with the specifications. In accordance with the example, each lens group is replaced by a piece of thin lens in the variable power optical system 3 in the following description.

First Example

FIG. 5 shows one of the typical variable power optical systems 3 with a 4-group configuration including, in order from the object side, the first lens group G1 with positive refractive power, the second lens group G2 with negative refractive power, the third lens group G3 with positive refractive power, and the fourth lens group G4 with negative refractive power. During the change in the magnification from the low-power end state to the high-power end state, the second lens group G2 moves in a certain direction from the object side to the image side, and the third lens group G3 moves in a certain direction from the image side to the object side. Therefore, the second lens group G2 and the third lens group G3 always move only in certain directions and do not move in reverse directions in the middle of the power changing operation.

In this zoom type, the second lens group G2 is set as the first correction lens group CG1, and when the magnification is changed to the low-power side as shown in FIG. 5, the second lens group G2 is moved to the object side and decentered to reduce the distance between the optical axes in the two variable power optical systems 3. As described, the first lens group G1 is fixed in the power changing operation, and the movement of the lens groups on the same optical axis as the first lens group G1 is not related to the decentering correction and will not be described (optical axis of the first lens group G1 serves as the "reference optical axis").

To ultimately eject the light from the variable power optical system 3 as an afocal luminous flux, a lens group different from the second lens group G2 needs to be used as the second correction lens group CG2 for the correction. As shown by an arrow of FIG. 5(a), in the correction by the third lens group G3 with positive refractive power, the third lens group G3 needs to be decentered in the same direction as the second lens group G2. The amount of decentering can be uniquely determined from the amount of decentering of the second lens group G2. Specifically, in accordance with the change in the magnification to the high-power side, the second lens group G2 approaches the optical axis of the first lens group G1 while moving to the image side (decentering movement). Meanwhile, the third lens group G3 approaches the optical axis of the first lens G1 while moving to the object side.

Alternatively, as shown by an arrow of FIG. 5(b), when the fourth lens group G4 with negative refractive power serves as the second correction lens group CG2 in the correction, the fourth lens group G4 needs to be decentered in the opposite direction of the second lens group G2. The amount of decentering can be uniquely determined from the amount of decentering of the second lens group G2. Specifically, in accordance with the change in the magnification to the high-power side, the second lens group G2 approaches the optical axis of the first lens group G1 while moving to the image side (decentering movement). Meanwhile, the fourth lens group G4 does not move in the optical axis direction (only moves in the vertical direction relative to the optical axis), but approaches the optical axis of the first lens G1.

The following Table 2 shows data of the variable power optical system 3 according to the first example. In Table 2, β denotes a magnification, f1 denotes a focal length of the first lens group G1, f2 denotes a focal length of the second lens group G2, f3 denotes a focal length of the third lens group G3, and f4 denotes a focal length of the fourth lens group G4. Furthermore, d1 denotes a distance between the first lens group G1 and the second lens group G2 on the optical axis, d2 denotes a distance between the second lens group G2 and the third lens group G3 on the optical axis, and d3 denotes a distance between the third lens group G3 and the fourth lens group G4 on the optical axis. Furthermore, ε(G2) denotes an amount of decentering of the second lens group G2, ε(G3) denotes an amount of decentering of the third lens group G3, and ε(G4) denotes an amount of decentering of the fourth lens group G4. Upward in the drawings is indicated as positive for the amount of decentering. The description of the data table is the same in the following second example.

TABLE 2

$\beta = 20x$
$f1 = 88.3$
$f2 = -20.7$
$f3 = 51.7$
$f4 = -55$

| | Low-Power End | High-Power End |
|---|---|---|
| d1 | 4.0618 | 57.45 |
| d2 | 131.7041 | 21.86519 |
| d3 | 21.5341 | 77.9848 |
| Amount of Decentering in Correction by G3 | | |
| ε (G2) | −3 | 0 |
| ε (G3) | −1.2934 | 0 |

TABLE 2-continued

| β = 20x |
| f1 = 88.3 |
| f2 = −20.7 |
| f3 = 51.7 |
| f4 = −55 |

|  | Low-Power End | High-Power End |
|---|---|---|
| Amount of Decentering in Correction by G4 | | |
| ε (G2) | −3 | 0 |
| ε (G4) | 1.91325 | 0 |

In the correction by both the third lens group G3 with positive refractive power and the fourth lens group G4 with negative refractive power, the amounts of decentering of both correction groups are not uniquely determined. In that case, although the design freedom improves, the mechanism is complicated.

Second Example

FIG. 6 shows one of the typical variable power optical systems with a 4-group configuration including, in order from the object side, the first lens group G1 with positive refractive power, the second lens group G2 with negative refractive power, the third lens group G3 with negative refractive power, and the fourth lens group G4 with positive refractive power. During the change in the magnification from the low-power end state to the high-power end state, the second lens group G2 moves in a certain direction from the object side to the image side. Meanwhile, the third lens group G3 moves in a certain direction from the object side to the image side based on the power arrangement of the variable power optical system 3 in some cases and reverses in the middle of the power changing operation to ultimately move to the image side in other cases.

In this zoom type, the second lens group G2 is set as the first correction lens group CG1, and when the magnification is changed to the low-power side as shown in FIG. 6, the second lens group G2 is moved to the object side and decentered to reduce the distance between the optical axes in the two variable power optical systems 3. The first lens group G1 is also fixed in the power changing operation in the second example, and the optical axis of the first lens group G1 serves as the "reference optical axis".

To ultimately eject the light from the variable power optical system 3 as an afocal luminous flux, a lens group different from the second lens group G2 needs to be used as the second correction lens group CG2 for the correction. As shown by an arrow of FIG. 6(*a*), in the correction by the third lens group G3 with negative refractive power, the third lens group G3 needs to be decentered in the opposite direction of the second lens group G2. The amount of decentering can be uniquely determined from the amount of decentering of the second lens group G2. Specifically, in accordance with the change in the magnification to the high-power side, the second lens group G2 approaches the optical axis of the first lens group G1 while moving to the image side (decentering movement). Meanwhile, the third lens group G3 approaches the optical axis of the first lens group G1 while moving to the object side in some cases and reverses the direction in the middle of the power changing operation to ultimately approach the optical axis of the first lens group G1 while moving to the image side in other cases.

Alternatively, as shown by an arrow of FIG. 6(*b*), when the fourth lens group G4 with positive refractive power serves as the second correction lens group CG2 in the correction, the fourth lens group G4 needs to be decentered in the same direction as the second lens group G2. The amount of decentering can be uniquely determined from the amount of decentering of the second lens group G2. Specifically, in accordance with the change in the magnification to the high-power side, the second lens group G2 approaches the optical axis of the first lens group G1 while moving to the image side (decentering movement). Meanwhile, the fourth lens group G4 does not move in the optical axis direction (only moves in the vertical direction relative to the optical axis), but approaches the optical axis of the first lens group G1.

The following Table 3 shows data of the variable power optical system 3 according to the second example.

TABLE 3

| β = 20x |
| f1 = 107.96 |
| f2 = −32.23 |
| f3 = −70.44 |
| f4 = 110.86 |

|  | Low-Power End | High-Power End |
|---|---|---|
| d1 | 27.8043 | 79 |
| d2 | 51.8816 | 68 |
| d3 | 70.3141 | 3 |
| Amount of Decentering in Correction by G3 | | |
| ε (G2) | −3 | 0 |
| ε (G3) | 3.2507 | 0 |
| Amount of Decentering in Correction by G4 | | |
| ε (G2) | −3 | 0 |
| ε (G4) | −1.91619 | 0 |

In the correction by both the third lens group G3 with negative refractive power and the fourth lens group G4 with positive refractive power, the amounts of decentering of both correction groups are not uniquely determined. In that case, although the design freedom improves, the mechanism is complicated.

Third Example

FIG. 7 shows a variable power optical system with a 5-group configuration additionally provided with a new lens group with negative refractive power between the second lens group G2 and the third lens group G3 shown in FIG. 5 (the new lens group will be referred to as G3 which is followed by G4 and G5). The newly added third lens group G3 may be configured to move along the optical axis in the power changing operation or may be fixed.

In this zoom type, the second lens group G2 is set as the first correction lens group CG1, and when the magnification is changed to the low-power side as shown in FIG. 7, the second lens group G2 is moved to the object side along the optical axis and decentered to reduce the distance between the optical axes in the two variable power optical systems 3. The first lens group G1 is also fixed in the power changing operation in the third example, and the optical axis of the first lens group G1 serves as the "reference optical axis".

To ultimately eject the light from the variable power optical system 3 as an afocal luminous flux, a lens group different from the second lens group G2 needs to be used as the second correction lens group CG2 for the correction. As shown by an arrow of FIG. 7(*a*), in the correction by the third lens group G3 with negative refractive power, the third lens group G3 needs to be decentered in the opposite direction of the second lens group G2. The amount of decentering can be uniquely determined from the amount of decentering of the second lens group G2. Specifically, in accordance with the change in the magnification to the high-power side, the second lens group G2 approaches the optical axis of the first lens group G1 while moving to the image side (decentering movement). Meanwhile, in some cases the third lens group G3 approaches the optical axis of the first lens group G1 without moving in the optical axis direction (but moving in the vertical direction relative to the optical axis), and in other cases the third lens group G3 approaches the optical axis of the first lens group G1 while moving to the image side or the object side.

Alternatively, as shown by an arrow of FIG. 7(b), when the fourth lens group G4 with positive refractive power serves as the second correction lens group CG2 in the correction, the fourth lens group G4 needs to be decentered in the same direction as the second lens group G2. The amount of decentering can be uniquely determined from the amount of decentering of the second lens group G2. Specifically, in accordance with the change in the magnification to the high-power side, the second lens group G2 approaches the optical axis of the first lens group G1 while moving to the image side (decentering movement). Meanwhile, the fourth lens group G4 approaches the optical axis of the first lens group G1 while moving to the object side (decentering movement).

Alternatively, as shown by an arrow of FIG. 7(c), when the fifth lens group G5 with negative refractive power serves as the second correction lens group CG2 in the correction, the fifth lens group G5 needs to be decentered in the opposite direction of the second lens group G2. The amount of decentering can be uniquely determined from the amount of decentering of the second lens group G2. Specifically, in accordance with the change in the magnification to the high-power side, the second lens group G2 approaches the optical axis of the first lens group G1 while moving to the image side (decentering movement). Meanwhile, the fifth lens group G5 does not move in the optical axis direction (only moves in the vertical direction relative to the optical axis), but approaches the optical axis of the first lens group G1. The amounts of decentering of the correction groups are not uniquely determined in the correction by at least two or more groups among the third lens group G3 with negative refractive power, the fourth lens group G4 with positive refractive power, and the fifth lens group G5 with negative refractive power. In that case, although the design freedom improves, the mechanism is complicated.

The following Table 4 shows data of the variable power optical system 3 according to the third example. In Table 4, β denotes a magnification, f1 denotes a focal length of the first lens group G1, f2 denotes a focal length of the second lens group G2, f3 denotes a focal length of the third lens group G3, f4 denotes a focal length of the fourth lens group G4, and f5 denotes a focal length of the fifth lens group G5. Furthermore, d1 denotes a distance between the first lens group G1 and the second lens group G2 on the optical axis, d2 denotes a distance between the second lens group G2 and the third lens group G3 on the optical axis, d3 denotes a distance between the third lens group G3 and the fourth lens group G4 on the optical axis, and d4 denotes a distance between the fourth lens group and the fifth lens group on the optical axis. Furthermore, ε(G2) denotes an amount of decentering of the second lens group, ε (G3) denotes an amount of decentering of the third lens group G3, ε(G4) denotes an amount of decentering of the fourth lens group G4, and ε(G5) denotes an amount of decentering of the fifth lens group G5. Upward in the drawings is indicated as positive for the amount of decentering. The description of the data table is the same in the following fourth example.

TABLE 4

| β = 20x |
|---|
| f1 = 76.8 |
| f2 = −42.2 |
| f3 = −37.9 |
| f4 = 44.1 |
| f5 = −84.1 |

| | Low-Power End | High-Power End |
|---|---|---|
| d1 | 3 | 47 |
| d2 | 45 | 1 |
| d3 | 59 | 1.1628 |
| d4 | 3 | 60.8 |
| Amount of Decentering in Correction by G3 | | |
| ε (G2) | −3 | 0 |
| ε (G3) | 1.847 | 0 |
| Amount of Decentering in Correction by G4 | | |
| ε (G2) | −3 | 0 |
| ε (G4) | −0.73312 | 0 |
| Amount of Decentering in Correction by G5 | | |
| ε (G2) | −3 | 0 |
| ε (G5) | 1.44487 | 0 |

During the change in the magnification to the high-power side, not only the second lens group G2, but also the third lens group G3 approaches the optical axis of the first lens group G1 together relative to the first lens group G1. When the second lens group G2 and the third lens group G3 serve as the first correction lens group CG1, a lens group other than the second lens group G2 and the third lens group G3 needs to be used as the second correction lens group CG2 for the correction to ultimately eject the light from the variable power optical system 3 as an afocal luminous flux.

When the fourth lens group G4 with positive refractive power serves as the second correction lens group CG2 in the correction, the fourth lens group G4 needs to be decentered in the same direction as the second lens group G2 and the third lens group G3. The amount of decentering can be uniquely determined from the amounts of decentering of the second lens group G2 and the third lens group G3. Specifically, as the magnification is changed to the high-power side, the second lens group G2 approaches the optical axis of the first lens group G1 while moving to the image side (decentering movement). In some cases the third lens group G3 approaches the optical axis of the first lens group G1 without moving in the optical axis direction (but moving in the vertical direction relative to the optical axis), and in other cases the third lens group G3 approaches the optical axis of the first lens group G1 while moving to the image side or the object side. Meanwhile, the fourth lens group G4 approaches the optical axis of the first lens group G1 while moving to the object side (decentering movement).

Alternatively, when the fifth lens group G2 with negative refractive power serves as the second correction lens group CG2 in the correction, the fifth lens group G5 needs to be decentered in the opposite direction of the second lens group G2 and the third lens group G3. The amount of decentering can be uniquely determined from the amounts of decentering of the second lens group G2 and the third lens group G3. Specifically, as the magnification is changed to the high-power side, the second lens group G2 approaches the optical axis of the first lens group G1 while moving to the image side (decentering movement). In some cases the third lens group G3 approaches the optical axis of the first lens group G1 without moving in the optical axis direction (but moving in the vertical direction relative to the optical axis), and in other cases the third lens group G3 approaches the optical axis of the first lens group G1 while moving to the image side or the object side (decentering movement). Meanwhile, the fifth lens group G5 does not move in the optical axis direction (only moves in the vertical direction relative to the optical axis), but approaches the optical axis of the first lens group G1. In the correction by both the fourth lens group G4 with positive refractive power and the fifth lens group G5 with negative refractive power, the amounts of decentering of both correction groups are not uniquely determined. In that case, although the design freedom improves, the mechanism is complicated.

Fourth Example

FIG. 8 shows a variable power optical system with a 5-group configuration additionally provided with a new lens group with positive refractive power between the second lens group G2 and the third lens group G3 shown in FIG. 6 (the new lens group will be referred to as G3 which is followed by G4 and G5). The newly added third lens group G3 may be configured to move along the optical axis in the power changing operation or may be fixed.

In this zoom type, the second lens group G2 is set as the first correction lens group CG1, and when the magnification is changed to the low-power side as shown in FIG. 8, the second lens group G2 is moved to the object side along the optical axis and decentered to reduce the distance between the optical axes in the two variable power optical systems 3. The first lens group G1 is also fixed in the power changing operation in the fourth example, and the optical axis of the first lens group G1 serves as the "reference optical axis".

To ultimately eject the light from the variable power optical system 3 as an afocal luminous flux, a lens group different from the second lens group G2 needs to be used as the second correction lens group CG2 for the correction. As shown by an arrow of FIG. 8(a), in the correction by the third lens group G3 with positive refractive power, the third lens group G3 needs to be decentered in the same direction as the second lens group G2. The amount of decentering can be uniquely determined from the amount of decentering of the second lens group G2. Specifically, in accordance with the change in the magnification to the high-power side, the second lens group G2 approaches the optical axis of the first lens group G1 while moving to the image side (decentering movement). Meanwhile, in some cases the third lens group G3 approaches the optical axis of the first lens group G1 without moving in the optical axis direction (but moving in the vertical direction relative to the optical axis), and in other cases the third lens group G3 approaches the optical axis of the first lens group G1 while moving to the image side or the object side.

Alternatively, as shown by an arrow of FIG. 8(b), when the fourth lens group G4 with negative refractive power serves as the second correction lens group CG2 in the correction, the fourth lens group G4 needs to be decentered in the opposite direction of the second lens group G2. The amount of decentering can be uniquely determined from the amount of decentering of the second lens group G2. Specifically, in accordance with the change in the magnification to the high-power side, the second lens group G2 approaches the optical axis of the first lens group G1 while moving to the image side (decentering movement). Meanwhile, the fourth lens group G4 approaches the optical axis of the first lens group G1 while moving to the object side (decentering movement).

Alternatively, as shown by an arrow of FIG. 8(c), when the fifth lens group G5 with positive refractive power serves as the second correction lens group CG2 in the correction, the fifth lens group G5 needs to be decentered in the same direction as the second lens group G2. The amount of decentering can be uniquely determined from the amount of decentering of the second lens group G2. Specifically, in accordance with the change in the magnification to the high-power side, the second lens group G2 approaches the optical axis of the first lens group G1 while moving to the image side (decentering movement). Meanwhile, the fifth lens group G5 does not move over the optical axis (only moves in the vertical direction relative to the optical axis), but approaches the optical axis of the first lens group G1. The amounts of decentering of the correction groups are not uniquely determined in the correction by at least two or more groups among the third lens group G3 with positive refractive power, the fourth lens group G4 with negative refractive power, and the fifth lens group G5 with positive refractive power. In that case, although the design freedom improves, the mechanism is complicated.

The following Table 5 shows data of the variable power optical system 3 according to the fourth example.

TABLE 5

$\beta = 20x$
$f1 = 103.6066$
$f2 = -21.44$
$f3 = 83.547$
$f4 = -82.5$
$f5 = 133.03$

| | Low-Power End | High-Power End |
|---|---|---|
| d1 | 16.2154 | 77 |
| d2 | 63.7846 | 3 |
| d3 | 26.6432 | 67 |
| d4 | 43.3577 | 3 |
| Amount of Decentering in Correction by G3 | | |
| $\varepsilon$ (G2) | −3 | 0 |
| $\varepsilon$ (G3) | −3.60856 | 0 |
| Amount of Decentering in Correction by G4 | | |
| $\varepsilon$ (G2) | −3 | 0 |
| $\varepsilon$ (G4) | 3.64982 | 0 |
| Amount of Decentering in Correction by G5 | | |
| $\varepsilon$ (G2) | −3 | 0 |
| $\varepsilon$ (G5) | −3.9912 | 0 |

During the change in the magnification to the high-power side, not only the second lens group G2, but also the third lens group G3 approaches the optical axis of the first lens group G1 together relative to the first lens group G1. When the second lens group G2 and the third lens group G3 serve as the first correction lens group CG1, a lens group other than the second lens group G2 and the third lens group G3 needs to be set as the second correction lens group CG2 for the correction to ultimately eject the light from the variable power optical system 3 as an afocal luminous flux.

When the fourth lens group G4 with negative refractive power serves as the second correction lens group CG2 in the correction, the fourth lens group G4 needs to be decentered in the opposite direction of the second lens group G2 and the third lens group G3. The amount of decentering can be uniquely determined from the amounts of decentering of the second lens group G2 and the third lens group G3. Specifically, as the magnification is changed to the high-power side, the second lens group G2 approaches the optical axis of the first lens group G1 while moving to the image side (decentering movement). In some cases the third lens group G3 approaches the optical axis of the first lens group G1 without moving in the optical axis direction (but moving in the vertical direction relative to the optical axis), and in other cases the third lens group G3 approaches the optical axis of the first lens group G1 while moving to the image side or the object side (decentering movement). Meanwhile, the fourth lens group G4 approaches the optical axis of the first lens group G1 while moving to the image side (decentering movement).

Alternatively, when the fifth lens group G5 with positive refractive power serves as the second correction lens group CG2 in the correction, the fifth lens group G5 needs to be decentered in the same direction as the second lens group G2 and the third lens group G3. The amount of decentering can be uniquely determined from the amounts of decentering of the second lens group G2 and the third lens group G3. Specifically, as the magnification is changed to the high-power side, the second lens group G2 approaches the optical axis of the first lens group G1 while moving to the image side (decentering movement). The third lens group G3 does not move in the optical axis direction (only moves in the vertical direction relative to the optical axis). In some cases the third lens group G3 approaches the optical axis of the first lens group G1 without moving in the optical axis direction (but moving in the vertical direction relative to the optical axis), and in other cases the third lens group G3 approaches the optical axis of the first lens group G1 while moving to the image side or the object side (decentering movement). In the correction by both the fourth lens group G4 with negative refractive power and the fifth lens group G5 with positive refractive power, the amounts of decentering of the correction groups are not uniquely determined. In that case, although the design freedom improves, the mechanism is complicated.

The foregoing are typical zoom types of the variable power optical system used in the parallel stereoscopic microscope apparatus 100 and examples of the zoom types. As described, it is desirable if the optical axes of all lens groups coincide at the highest power of the variable optical system 3 (the optical axes are on a line parallel to the optical axis of the objective lens 1) because the entrance pupil of the variable power optical system 3 is larger than when part of the lens groups is decentered at the highest power. Other than the examples described above, there are countless solutions for decentering the optical axis while maintaining the afocal variable power optical system by increasing the movable groups in the variable power optical system 3 or changing the combination of the lens groups to be decentered to complicate the movements of the decentering correction groups. However, the solutions can be easily imagined from the description, and the solutions are considered to be included in the present invention.

Trajectory during Change in Magnification of Variable Power Optical System

If the incident position is a position away from the optical axis when a ray with a large angle θ' enters the object-side surface of the lens arranged closest to the object of the variable power optical system 3' in FIG. 31, the ray approaches the aperture radius of the lens. This leads to a reduction in the amount of ambient light and causes a reduction in the amount of light. Therefore, a configuration of the imaging optical system 5, specifically, the variable power optical system 3, with controlled reduction in the amount of light during the change in the magnification will be described.

Hereinafter, a case in which the variable power optical system 3 includes lens data shown in Table 6 will be described. In Table 6, f1 denotes a focal length of the first lens group G1, f2 denotes a focal length of the second lens group G2, f3 denotes a focal length of the third lens group G3, and f4 denotes a focal length of the fourth lens group G4. Furthermore, d1 denotes a distance between principal points of the first lens group G1 and the second lens group G2, d2 denotes a distance between principal points of the second lens group G2 and the third lens group G3, d3 denotes a distance between principal points of the third lens group G3 and the fourth lens group G4, and f denotes a combined focal length between the variable power optical system 3 and an imaging lens group not shown. Table 6 shows values in a low-power end state, a medium power state, and a high-power end state for each. The magnification of the variable power optical system 3 is 25 times, and the focal length of the imaging lens is 200 mm. In the variable power optical system 3, the second lens group G2 moves in a certain direction from the object side to the image side, and the third lens group G3 moves in a certain direction from the image side to the object side when the magnification is changed from the low-power end state to the high-power end state.

TABLE 6

$f1 = 88.423$
$f2 = -20.702$
$f3 = 51.711$
$f4 = -55.136$

|    | Low-Power End | Medium Power | High-Power End |
|----|---------------|--------------|----------------|
| d1 | 4.08          | 47.02        | 58.69          |
| d2 | 131.80        | 62.02        | 13.86          |
| d3 | 21.44         | 48.29        | 84.77          |
| f  | 50.40         | 322.18       | 1259.33        |

In general, the trajectories of the movable groups constituting the variable power optical system during the change in the magnification are uniquely determined from focal lengths of the groups and intervals between principal points at a predetermined magnification in the variable power range. First, a case in which the variable power optical system 3 is not decentered during the change in the magnification (the second lens group G2 and the third lens group G3 move only along the optical axes) will be described.

As shown in FIG. 9, if the second lens group G2 is moved from the low-power end state to the high-power end state along the optical axis, the distance from an object-side vertex of the first lens group G1 (vertex of the object-side surface of the lens positioned closest to the object) to an entrance pupil plane (entrance pupil position) increases. The amount of movement in the optical axis direction of the second lens group G2 in FIG. 9 is indicated by setting the low-power end state as 0 and setting the direction moving toward the high-power end side as positive. The same applies to other drawings. As shown in FIG. 10, tangent (tan θ) of an angle (principal ray incidence angle) θ relative to the reference optical axis A of a principal ray entering the variable power optical system 3 relative to the amount of movement in the optical axis direction of the second lens group G2 decreases as the magnification is changed from the low-power end state to the high-power end state, and the amount of change also decreases. As shown in FIG. 11(a), the principal ray in FIG. 10 is a principal ray (hereinafter, called "principal ray m") with the largest angle (principal ray incidence angle θ) entering the variable power optical system 3 (first lens group G1) among the principal rays passing through the center of the diaphragm S of the variable power optical system 3.

Assuming that the distance between the position where the principal ray m enters the tangent plane passing through the vertex on the optical axis of the first lens group G1 and the reference optical axis A (incidence height of the principal ray m relative to the tangent plane of the first lens group G1, hereinafter called "principal ray incidence height") is h as shown in FIG. 11(b), the principal ray incidence height h can be calculated by a product of the distance from the object-side vertex of the first lens group G1 to the entrance pupil and the tangent of the principal ray incidence angle θ entering the variable power optical system 3. The principal ray incidence height h relative to the amount of movement in the optical axis direction of the second lens group G2 changes as shown in FIG. 12. More specifically, during the change in the magnification from the low-power end state to the high-power end state, the height first increases in a direction away from the optical axis and then approaches the optical axis direction after a predetermined amount of movement in the optical axis direction and decreases.

Meanwhile, if the first correction lens group CG1 (second lens group G2) is decentered during the change in the magnification as shown in FIG. 13(b) in the variable power optical system 3, the principal ray incidence height becomes larger than the principal ray incidence height h without decentering shown in FIG. 13(a) (incident position of the principal ray to the tangent plane of the first lens group G1 moves away from the optical axis). As a result, the incident position of the principal ray m to the tangent plane of the first lens group G1 approaches the aperture radius of the first lens group G1, and the amount of ambient light is reduced.

Therefore, to prevent the reduction in the amount of ambient light, it is necessary to select the trajectory during the change in the magnification of the second lens group G2 so that the tangent plane incident position of the first lens group G1 of the principal ray m is not too apart from the reference optical axis A. As described, the principal ray incidence height h temporarily increases and then decreases when the magnification is changed from the low-power end state (at the lowest power) to the high-power end side in the variable power optical system 3. Meanwhile, the second lens group G2 (first correction lens group CG1) is decentered to the greatest extent from the reference optical axis A in the low-power end state (at the lowest power), and as the magnification is changed to the high-power end side, the second lens group G2 moves to coincide with the reference optical axis A. The optical axes of all lens groups G1 to G4 substantially match in the high-power end state (at the highest power). Therefore, the amount of change in the amount of movement to the reference optical axis A side of the second lens group G2 (amount of change in the amount of movement in the direction perpendicular to the reference optical axis A) is increased in the low-power end side to control the increase in the principal ray incidence height h on the low-power end side during the change in the magnification.

Specifically, as shown in FIG. 14, when the amount of movement in the optical axis direction of the second lens group G2 is set as X, and the amount of movement in the direction perpendicular to the reference optical axis A (amount of movement in the perpendicular direction) is set as Y in the plane including the reference optical axis A of the variable power optical system 3 and the optical axis of the objective lens 1 to express the trajectory during the change in the magnification of the second lens group G2 (amount of movement Y in the perpendicular direction) as a function of the amount of movement X in the optical axis direction, the trajectory is constituted to satisfy a condition in which a first derivative of the function Y by X is 0 or more at at least part of the section of the variable power range, and a second derivative is 0 or less. In the function, the direction away from the reference optical axis A is defined as a negative direction (direction in which the optical axis is 0, and values away from the optical axis are negative) for the amount of movement Y in the perpendicular direction, and the direction moving toward the image is defined as a positive direction (direction in which the low-power end state (at the lowest power) is 0, and the value increases toward the high-power end side) for the amount of movement X in the optical axis direction.

If the first derivative of the trajectory (function Y) during the change in the magnification of the second lens group G2 is negative, the incident position of the principal ray m to the tangent plane of the first lens group G1 is farther away from the reference optical axis A when the magnification is changed from the low-power end state (at the lowest power) to the high-power end side regardless of the result of the second derivative. Therefore, the ray approaches the aperture radius of the first lens group G1, and the amount of ambient light decreases. If the first derivative of the trajectory (function Y) is 0 or more in the variable power range, and the second derivative is positive, it is difficult to cancel the increase in the incidence height h of the principal ray m to the tangent plane of the first lens group G1 in association with the change in the magnification by the amount of decentering of the second lens group G2. Although the trajectory for canceling the tangent plane incidence height h can be theoretically considered, the trajectory is not preferable because a configuration of the mechanism for moving the second lens group G2 is difficult. As a result, the incident position of the principal ray m to the tangent plane of the first lens group G1 in association with the variable power approaches the aperture radius of the first lens group G1 if the second derivative is positive. Therefore, the amount of ambient light decreases.

If the second lens group G2 is moved along the trajectory shown in FIG. 14, the principal ray incidence height h of the principal ray m relative to the tangent plane of the first lens group G1 is as shown in FIG. 15 relative to the amount of movement in the optical axis direction of the second lens group G2. More specifically, as a result of the adjustment of the trajectory during the change in the magnification of the second lens group G2, the principal ray incidence height h temporarily decreases (principal ray incident position at the tangent plane approaches the optical axis) during the movement from the low-power end state (at the lowest power) to the high-power end side and increases up to a predetermined amount of movement in the optical axis direction. The principal ray incidence height h then decreases, and the principal ray incidence height h can be configured not to be higher than the height at the low-power end state (during the lowest power) in the entire variable power range from the low-power end state to the high-power end state. Therefore, designing the aperture radius of the first lens group G1 to the size not reducing the amount of ambient light in the low-power end state (at the lowest power) allows a configuration for preventing the amount of ambient light from being reduced during the change in the magnification. FIG. 14 shows a case in which the second lens group G2 moves to form a trajectory according to the function indicated by the following expression (1). The first derivative is positive, and the second derivative is negative.

$$Y=-2+X^{0.1733} \tag{1}$$

First Derivative $0.1733X^{-0.8267}>0$
Second Derivative $-0.14326711X^{-1.8267}<0$ Movement of Diaphragm In the microscope apparatus 100 according to the present embodiment, the diaphragm S constituting the variable power optical system 3 is arranged between the second lens group G2 (first correction lens group CG1) and the third lens group G3 (second correction lens group CG2) as described above. The entrance pupil of the variable power optical system 3 is an image of the diaphragm S created by the first lens group G1 and the second lens group G2 (first correction lens group CG1), and the exit pupil of the variable power optical system 3 is an image of the diaphragm S created by the third lens group G3 and the fourth lens group G4 (at least one of the groups is the second correction lens group CG2). Therefore, if the second lens group G2 (first correction lens group CG1) and the third lens group G3 or the fourth lens group G4 (second correction lens group CG2) are decentered, the images of the diaphragm S, or the entrance pupil and the exit pupil, are also decentered. As described, the maximum diameter of the light passing through the objective lens 1 is reduced by decentering the entrance pupil, and there is an advantage that the diameter of the objective lens 1 can be reduced and miniaturized. Meanwhile, although the exit pupil is relayed by the imaging lens 4 and the eyepiece 6 to form an eye point EP (location where the eye of the observer should be placed) shown in FIG. 16, if the exit pupil is decentered, the eye point EP positioned on the optical axis as shown in FIG. 16(a) is decentered as in FIG. 16(b). As described, since the amount of decentering of the lens group changes along with the change in the magnification in the variable power optical system 3, the amount of decentering of the eye point EP also changes along with the change in the magnification, and the observation is obstructed. To prevent this, the diaphragms S are decentered along with the change in the magnification in the present embodiment. More specifically, the diaphragms S are moved to reduce the distance between the centers of the diaphragms S of the left and right variable power optical systems 3 (bring close to the optical axis of the objective lens 1) to cancel the decentering of the exit pupil caused by decentering of the third lens group G3 or the fourth lens group G4 (second correction lens group CG2). As a result, the decentering of the eye point EP is corrected as shown in FIG. 16(c).

The luminous flux entering the variable power optical system 3 is the maximum during the highest power. Therefore, as described, it is desirable that the optical axes of all lens groups and the centers of the diaphragms S included in the variable power optical system 3 substantially match (substantially coincide with the reference optical axis A) to effectively use the entrance pupil of the variable power optical system 3 during the highest power of the variable power optical system 3.

Instead of decentering the diaphragms S along with the decentering of the second correction lens group CG2, if a precise circle including the entire area where an aperture section of the diaphragm S is swept in the variable-power section is set as an aperture section as shown in FIG. 17, in other words, if a diaphragm S1 including an aperture section including the entire area of the luminous flux moved by the change in the magnification is arranged, or if the entire area where an aperture section of the diaphragm S is swept in the variable-power section is set as an aperture section as shown in FIG. 18, in other words, if a changed diaphragm S2 including an aperture section including the entire area of the luminous flux moved by the change in the magnification is arranged, the eye point EP is not out of sight of the observer even if the eye point EP shown in FIG. 16 is enlarged and decentered. In FIGS. 17 and 18, the position in the low-power end state of the diaphragm S decentered according to the change in the magnification of the variable power optical system 3 (position in the decentered state) is set as SL, and the position in the high-power end state (position without decentering) is set as SH.

Example

The following Table 7 shows amounts of decentering of the lens groups G2 and G3 and an amount of decentering of the diaphragm S when the second lens group G2 is set as the first correction lens group CG1, and the third lens group G3 is set as the second correction lens group CG2 in the variable power optical system 3 with a negative-positive-negative-positive 4-group configuration shown in FIG. 4 in which the second lens group G2 and the third lens group G3 move in opposite directions along the optical axis during the change in the magnification. In Table 7, f1 denotes a focal length of the first lens group G1, f2 denotes a focal length of the second lens group G2, f3 denotes a focal length of the third lens group G3, and f4 denotes a focal length of the fourth lens group G4. Furthermore, D1 denotes a spacing between the first lens group G1 and the second lens group G2 on the optical axis, D2 denotes a spacing between the second lens group G2 and the diaphragm S on the optical axis, D3 denotes a spacing between the diaphragm S and the third lens group G3 on the optical axis, and D4 denotes a spacing between the third lens group G3 and the fourth lens group G4 on the optical axis. Although the lens actually has a thickness, only the behavior of the ray entering the lens and the ray ejected from the lens can be considered as an effect of the lens, and a replacement to a thin lens with a thickness that can be ignored is theoretically possible. Particularly, since the number of lens groups is small in the variable power optical system, approximation to the thin lens is easy. It is typical to replace the lens groups by thin lenses to determine the optimal focal length and the arrangement of the lens groups corresponding to the specifications. In accordance with the example, each lens group is replaced by a piece of thin lens in the following variable power optical system 3.

TABLE 7

| f1 = 88.42 |
| f2 = −20.70 |
| f3 = 51.71 |
| f4 = −55.14 |

|  | Low-Power End | High-Power End |
| --- | --- | --- |
| D1 | 4.08 | 58.69 |
| D2 | 63.54 | 8.93 |
| D3 | 68.26 | 4.93 |
| D4 | 21.44 | 84.77 |
| Amount of Decentering of Second Lens Group | −3.00 | 0.00 |
| Amount of Decentering of Third Lens Group | −1.29 | 0.00 |

TABLE 7-continued f1 = 88.42
f2 = −20.70
f3 = 51.71
f4 = −55.14

|  | Low-Power End | High-Power End |
|---|---|---|
| Amount of Decentering of Diaphragm | −1.70 | 0.00 |

As shown in Table 7, if the second lens group G2, the third lens group G3, and the diaphragm S are decentered, miniaturization of the objective lens 1 can be realized based on the second lens group G2 decentered in accordance with the power changing operation of the variable power optical system 3. A substantially parallel luminous flux entered in the variable power optical system 3 can be ejected as a substantially parallel luminous flux as a result of the decentering of the third lens group G3, and decentering of the eye point can be prevented even if the third lens group G3 is decentered as a result of the decentering of the diaphragm S.

Configuration of Illumination Optical System

The entrance pupil of the imaging optical system 5 needs to be filled by the illumination light to perform an appropriate transmitted illumination observation in the microscope apparatus. This also requires filling the entrance pupil conjugate image of the imaging optical system 5 in the opposite direction of the objective lens 1 as seen from the surface of the object (called "illumination optical system side" in the following description) with the illumination light. However, as shown in FIG. 19(a), the entrance pupil of a stereoscopic microscope apparatus 100' is decentered relative to the optical axis of an objective lens 1' because a variable power optical system 3' is divided into two optical paths. Accordingly, an entrance pupil conjugate image PI' on the side of a transmissive illumination optical system 20' is also decentered relative to the optical axis of the objective lens 1'. Therefore, the transmissive illumination optical system 20' needs to supply the illumination light to a location away from the optical axis of the objective lens 1', and there is an enlargement in the vertical plane relative to the optical axis of the objective lens 1' (diameter d1 in FIG. 19(a)). In general, the position of the entrance pupil conjugate image PI' is farther (away from the optical axis in a direction perpendicular to the optical axis of the objective lens 1') in a low-power end state shown in FIG. 19(a) than in a high-power end state shown in FIG. 19(b). Therefore, the enlargement of the required transmissive illumination optical system 20' is more noticeable than in the high-power end state.

However, as described, the entrance pupil of the imaging optical system (variable power optical system 3) decenters in a direction in which the distance between optical axes of the left and right optical paths is reduced during low-power in the microscope apparatus 100 according to the present embodiment. More specifically, as shown in FIG. 19(c), the entrance pupil of the imaging optical system 5 decenters in the direction in which the distance between the optical axes of the left and right optical paths is reduced. Therefore, an entrance pupil conjugate image PI on the side of a transmissive illumination optical system 20 also approaches the optical axis of the objective lens 1. As a result, a diameter d2 of the transmissive illumination optical system 20 that supplies illumination light to the microscope apparatus 100 according to the present embodiment has a relationship of d1>d2 in relation to a diameter d1 of the transmissive illumination optical system 20' of the conventional microscope apparatus 100', and the required transmissive illumination optical system 20 can be reduced.

As for the angles of the illumination light directing the samples (surfaces of the objects O and O'), θ2 of FIG. 19(c) is smaller than θ1 of FIG. 19(a). In general, the luminance is higher near the optical axis direction in the illumination optical system. Therefore, a bright illumination optical system can be more easily constructed in the present embodiment. Specific examples of configuration of the illumination optical system include arranging a surface light source near the entrance pupil conjugate image PI and forming a light source image near the entrance pupil conjugate image PI. Particularly, the size of the surface light source directly affects the cost when the surface light source is arranged. Therefore, a large advantage can be obtained by the present embodiment that can reduce the size of the illumination optical system.

Like the transmitted illumination observation, a coaxial epi-illumination observation is also possible in the microscope apparatus according to the present embodiment. The coaxial epi-illumination is an illumination method of matching the optical axis of the observation optical system and the optical axis of the epi-illumination optical system. FIG. 20 shows a case of arranging a coaxial epi-illumination apparatus 109 in which deflection elements 7 (for example, half mirrors) are inserted between the objective lens 1 and the observation optical systems 2 (variable power optical systems 3) to insert the illumination light from the light source 110 through an epi-illumination optical system 8 from the side. According to the configuration shown in FIG. 20, the illumination light exited from the light source 109 passes through the epi-illumination optical system 8, is reflected by the defection element 7, enters the objective lens 1, is collected by the objective lens 1, and is directed to the sample (object) on the sample platform 102. The coaxial epi-illumination observation is possible in the entire variable power range of the variable power optical system 3 by including the variable power optical system for illumination light with the same variable power range as the variable power optical system 3 in the epi-illumination optical system 8. Alternatively, the coaxial epi-illumination apparatus 109 with a compact configuration can be formed by forming the epi-illumination optical system 8 not for the entire variable power range, but for part of the variable power range, or the epi-illumination optical system 8 with a fixed magnification. The coaxial epifluorescent observation is also possible by arranging in the epi-illumination optical system 8 a filter that selectively transmits an excitation wavelength and arranging dichroic mirrors as the deflection elements 7 that selectively reflect the excitation wavelength and that selectively transmit a fluorescence wavelength generated by the sample (object).

FIG. 21 shows a case in which a coaxial epi-illumination apparatus 111 is inserted between the variable power optical systems 3 and the imaging lenses 4 inside the observation optical systems 2. According to the configuration shown in FIG. 21, the illumination light ejected from light sources 112 passes through epi-illumination optical systems 10, is reflected by defection elements 9 (for example, beam splitter prisms), and enters the variable power optical systems 3. The illumination light is guided to the objective lens 1 by the variable power optical systems 3 and directed to the sample (surface of the object O). In this case, since the variable power optical system 3 is shared by the observation optical systems 2 and the epi-illumination optical systems 10, the coaxial epi-illumination observation is possible across the entire variable power range without including independent variable power optical systems for illumination light in the epi-illumination optical systems 10. As in the case of FIG. 20, simultaneous epifluorescent observation is possible by arranging in the epi-illumination optical system 10 a filter that selectively transmits an excitation wavelength and arranging dichroic mirrors as the deflection elements 9 that selectively reflect the excitation wavelength and that selectively transmit a fluorescence wavelength generated by the sample (object).

However, when the coaxial epi-illumination apparatus 111 is inserted at the position indicated in FIG. 21, the first correction lens group CG1 (second lens group G2) and the second correction lens group CG2 (third lens group G3) in the variable power optical systems 3 move in the direction including the component perpendicular to the reference optical axis A during the change in the magnification. Therefore, as described, the exit pupils also move in the direction including the component perpendicular to the reference optical axis A. Thus, a decentering mechanism that decenters the illumination lenses of the epi-illumination optical systems 10 in accordance with the decentering of the exit pupils of the imaging optical systems 5 (variable power optical systems 3) to move the light source images can be arranged to cause the light source images to overlap the exit pupils. This can realize efficient illumination. An example of configuration of the coaxial epi-illumination apparatus 111 will be described below.

First Example

As shown in FIG. 22, the variable power optical systems 3 are arranged on the image side of the objective lens 1 in the microscope apparatus 100 according to a first embodiment, and the coaxial epi-illumination apparatus 111 is mounted further close to the image. Although the epi-illumination optical systems 10 constituting the coaxial epi-illumination apparatus 111 are actually folded and arranged at the back of FIG. 22, the epi-illumination optical systems 10 are illustrated in the same plane for convenience of description. The light sources 112 shown in FIG. 21 are guided through fibers from a light source apparatus not shown, and end faces of the fibers serve as the light sources 112 in the description here.

The illumination lenses 11 collect the illumination light ejected from the light sources (fiber end faces) 112. The deflection elements (divided composite prisms) 9 reflect the illumination light, and the illumination light enters the same optical path as the imaging optical system 5. In the coaxial epi-illumination apparatus 111, an afocal optical system including positive lens groups 13 and negative lens groups 16 is arranged at the front and back of the deflection elements 9. The afocal optical system has a function of restoring the exit pupils of the first image IM formed by the imaging lenses 6 arranged on the image side to their original positions when the exit pupils get far away from their positions in the first image IM before the insertion of the coaxial epi-illumination apparatus 111 due to the thickness of the coaxial epi-illumination apparatus 111 being inserted into the optical paths of the imaging optical system 5. Such a Galileo-type afocal optical system usually shifts the imaging magnification to the high-power side by about 1.2 to 1.5 times. The illumination light is reflected by the deflection elements 9 and enters the variable power optical system 3 through the positive lens groups 13 of the afocal optical system.

As shown in FIG. 22, polarizers 12 and analyzers 15 are arranged on the side of the light sources 112 and on the side of the imaging lenses 6 of the deflection elements 9, and a quarter-wave plate 14 is arranged on the object O side of the objective lens 1. The polarizers 12 and the analyzers 15 are in a crossed Nicols arrangement, and the quarter-wave plate 14 is rotatable so that the fast axis stops at positions forming 45 degrees to the axes of the polarizers 12 and the analyzers 15. These components function as a optical isolator. Although the illumination light subjected to linear polarization by the polarizers 12 becomes noise light when the illumination light is reflected by lens surfaces in the variable power optical systems 3, the analyzers 15 block the noise light. Meanwhile, when the illumination light passes through the variable power optical systems 3 and the objective lens 1 and enters the quarter-wave plate 14, the polarization state becomes circular polarization. Therefore, even if the reflectivity of the object O is dependent on the polarization, the dependency does not affect the observed image, and the light can be observed as bright-field illumination. The circular polarization reflected by the object O becomes linear polarization (therefore, the same polarization direction as the analyzers 15) perpendicular to the entered linear polarization (polarization direction of the polarizers 12) when the light passes through the quarter-wave plate 14 again. After subjected to an enlargement action by the objective lens 1 and the variable power optical systems 3, the signal light transmits the deflection elements 9 and transmits the analyzers 15. In this way, the microscope apparatus 100 includes a mechanism for improving S/N of the observed image.

Configurations of the lenses that guide the illumination light ejected from the light sources 112 to the variable power optical systems 3 among the lenses constituting the coaxial epi-illumination apparatus 111 will be described using data. Here, the ray will be followed in order of the object O, the objective lens 1, the variable power optical systems 3, and the coaxial epi-illumination apparatus 111. The data of the objective lens 1 is illustrated in Table 1, and the data of the variable power optical systems 3 is illustrated in Table 2 (the third lens group G3 serves as the second correction lens group CG2). Therefore, the coaxial epi-illumination apparatus 111 is inserted after a 13th plane of Table 1 through the variable power optical systems 3 of Table 2.

The following Table 8 shows data of the optical system constituting the coaxial epi-illumination apparatus 111. Plane numbers in Table 8 are as shown in FIG. 23. A 17th plane and an 18th plane indicate optical planes of the deflection element 9, and a 21st plane denotes the light source 112 (fiber end). In a radius of curvature r of Table 8, ∞ denotes a plane (the same applies to the following description).

TABLE 8

| m | r | d | nd | vd |
|---|---|---|---|---|
| 14 | 54.472 | 1.6 | 1.671629 | 38.798 |
| 15 | 22.0875 | 2.7 | 1.60411 | 60.645 |
| 16 | −177.143 | 6.2 | | |
| 17 | ∞ | 16 | 1.568829 | 56.048 |
| 18 | ∞ | 66 | | |
| 19 | 20.122 | 3 | 1.516800 | 64.103 |
| 20 | −20.122 | 21 | | |
| 21 | ∞ | | | |

In FIG. 23, X denotes how the ray passing through the center of the diaphragm S passes through the optical system of the coaxial epi-illumination apparatus 111 in the variable power optical system 3 in the optical path on the right side. In the microscope apparatus 100 according to the present embodiment, the ray X passing through the center of the diaphragm S of the variable power optical system 3 is decentered by −0.58 mm in the low-power end state of the variable power optical system 3 when the ray X reaches the 21st plane (fiber end) of the epi-illumination apparatus 111. (The decentering direction shown in FIG. 23 that is δ shown in FIG. 23 is illustrated as negative.) This is the amount of decentering of the exit pupil generated in association with the decentering of the second correction lens group CG2 (third lens group G3) of the variable power optical system 3. If the illumination lens 11 is decentered to make a correction so that the ray X reaches the center of the 21st plane, the exit pupil and the light source image can be placed on top of each other. As for the amount of correction, the illumination lens 11 can be decentered by +0.51 mm relative to the amount of decentering −1.2934 mm of the third lens group G3. In another example, instead of decentering the illumination lens 11, the end face may be decentered by +0.58 mm if a light source such as an optical fiber is used. In the configuration shown in FIGS. 22 and 23, a two-branch fiber with a φ4 mm ejection end face is used to deliver the light from the light source apparatus for fiber to the illumination systems of two systems (left and right optical paths). If the decentering of the illumination lens 11 (or fiber end) is steplessly and continuously driven in association with the decentered trajectory of the second correction lens group CG2 of the variable power optical system 3, the observer can perform observation without stress.

If at least two positions (for example, two positions on the low-power side and the high-power side) can be switched in the decentering mechanism of the illumination lens 11 (or fiber end) instead of steplessly driving the decentering mechanism, the configuration of the decentering mechanism of the epi-illumination apparatus 111 is simplified, and the cost is reduced.

Second Embodiment

Although a case in which the illumination lens 11 (or fiber end) is decentered in accordance with the exit pupil decentered by the movement of the second correction lens group CG2 has been described in the first embodiment, the light source image formed by the illumination lens 11 can be enlarged so that the exit pupil does not extend beyond the light source image even if the exit pupil is moved (form a light source image in a size including the trajectory of the exit pupil moved during the change in the magnification of the variable power optical system 3). As a result of enlarging the light source image, the decentering mechanism for the illumination optical system 10 of the coaxial epi-illumination apparatus 111 is not necessary, and the configuration can be simplified. The enlargement of the light source image can be realized by enlarging the used light source (enlarge the fiber ejection end face) or enlarging the light source magnification of the illumination optical system 10. The focal length of the illumination lens 11 can be reduced to enlarge the light source magnification. For example, the enlargement can be realized by setting the optical system as shown in the following Table 9. The configuration of the coaxial epi-illumination apparatus 111 is the same as in the first example.

TABLE 9

| m | r | d | nd | vd |
|---|---|---|---|---|
| 14 | 54.472 | 1.6 | 1.671629 | 38.798 |
| 15 | 22.0875 | 2.7 | 1.60411 | 60.645 |
| 16 | −177.143 | 6.2 | | |
| 17 | ∞ | 16 | 1.568829 | 56.048 |
| 18 | ∞ | 66 | | |
| 19 | 10.0 | 3 | 1.516800 | 64.103 |
| 20 | −10.0 | 10 | | |
| 21 | ∞ | | | |

As a result of using the optical system with the data shown in Table 9, the amount of decentering of the illumination lens 11 can be reduced to −0.28 mm relative to the amount of decentering −1.2934 mm of the third lens group G3. Therefore, the amount of decentering relative to the size of the light source can be ignored, and the illumination range is not deviated by the decentering.

Light Shielding Method in Imaging Optical System

As described, in the variable power optical system 3 of the microscope apparatus 100 according to the present embodiment, left and right lens groups constituting the second lens group G2 and the third lens group G3 as movable groups move over the reference optical axis A in accordance with the magnification and move in the direction perpendicular to the reference optical axis A. Therefore, as the left and right second lens group G2 and third lens group G3 move in the direction perpendicular to the optical axis, the space changes (for example, the size of the space (gap) generated between the left and right lens groups changes). Therefore, the light outside the field of view may not enter the second lens group G2 and the third lens group G3, but may pass through the space to enter the following lens groups or optical systems to cause flare or ghost. Thus, the microscope apparatus 100 according to the present embodiment includes light shielding units that block at least the light passing through the optical axis side of the objective lens 1 among the light passing through the space around the lens groups G2 and G3 without entering the second lens group G2 and the third lens group G3 as movable groups to prevent the generation of flare or ghost.

Hereinafter, a specific configuration of the light shielding units arranged on the second lens group G2 and the third lens groups G3 as movable groups of the variable power optical system 3 according to the present embodiment will be described. The same constituent members as described above are designated with the same reference numerals, and the detailed description will not be repeated. In the following description, L is added to reference numerals of the members arranged in the optical path on the left side, and R is added to reference numerals of the members arranged in the optical path on the right side. In the drawings, M denotes eyes of the observer.

First Example

A configuration of the variable power optical system 3 of the microscope apparatus 100 according to a first example will be described using FIGS. 24 and 25. As shown in FIG. 24, light shielding units H2 and H3 are arranged between the left and right lens groups (G2L, G2R; G3L, G3R) of the second lens group G2 and the third lens group G3 in the variable power optical system 3, the light shielding units H2 and H3 connecting the lens groups (G2L, G2R; G3L, G3R). The light shielding units H2 and H3 are arranged to have structures in which the sizes (lengths in the direction perpendicular to the optical axis of the objective lens 1 (or lengths in the direction perpendicular to the reference optical axis A, the same applies hereinafter)) of the light shielding units H2 and H3 change along with the movement of the left and right lens groups (G2L, G2R; G3L, G3R), and the light passing through the space generated between the lens groups (G2L, G2R; G3L, G3R) is blocked. More specifically, although the shapes of the light shielding units H2 and H3 can be any shapes as long as the light shielding units H2 and H3 can freely expand and contract along with the movement of the left and right lens groups (G2L, G2R; G3L, G3R), it is preferable that the light shielding units H2 and H3 have structures bendable in expansion/contraction directions, such as a bellows structure and a folding-screen structure. The expansion/contraction directions are directions perpendicular to the optical axis of the objective lens 1 between the left and right lens groups (G2L, G2R; G3L, G3R) and are left and right directions in the drawings.

More specifically, as shown in FIG. 25(a), the left and right lens groups (G2L, G2R; G3L, G3R) of the second lens group G2 and the third lens group G3 move away from each other in directions perpendicular to reference optical axes AL and AR when the magnification is changed to the high-power end side. In this case, the light shielding units H2 and H3 arranged between the left and right lens groups (G2L, G2R; G3L, G3R) extend in directions of the movement of the left and right lens groups (G2L, G2R; G3L, G3R). On the other hand, as shown in FIG. 25(b), the left and right lens groups (G2L, G2R; G3L, G3R) of the second lens group G2 and the third lens group G3 move to approach each other in directions perpendicular to the reference optical axes when the magnification is changed to the low-power end side. In this case, the light shielding units H2 and H3 arranged between the left and right lens groups (G2L, G2R; G3L, G3R) contract in the moving directions of the left and right lens groups. This can block the light passing through the space formed between the left and right lens groups (G2L, G2R; G3L, G3R) of the second lens group G2 and the third lens group G3 as movable groups to prevent the light from entering the following lens groups or optical systems, and the generation of flare or ghost can be prevented.

Second Example

A configuration of the variable power optical system 3 of the microscope apparatus 100 according to a second example will be described using FIGS. 26 to 28. As shown in FIG. 26, different points from the first example in the microscope apparatus 100 according to the second example are configurations of the second lens group G2 and the third lens group G3 of the variable power optical system 3. Like the second lens group G2 and the third lens group G3 according to the second embodiment, the second lens group G2 and the third lens group G3 of the variable power optical system 3 of the microscope apparatus 100 according to the present example are movable groups, and the groups can move in directions of the reference optical axes AL and AR and in directions perpendicular to the optical axes. The moving directions of the second and third lens groups G2 and G3 when the magnification is changed from the low-power end state to the high-power end state are the same as in the first example.

As shown in FIG. 27, the second lens group G2 of the variable power optical system 3 includes first members 21 that hold the left and right lens groups G2L and G2R and a second member 22 that moves the entire second lens group G2 in the optical axis direction and that holds the left and right lens groups G2L and G2R held by the first members 21 so that the left and right lens groups G2L and G2R can be moved in directions perpendicular to the optical axis. Similarly, the third lens group G3 includes first members 31 that hold the left and right lens groups G3L and G3R and a second member 32 that moves the entire third lens group G3 in the optical axis direction and that holds the left and right lens groups G3L and G3R held by the first members 31 so that the left and right lens groups G3L and G3R can move in directions perpendicular to the optical axis.

As shown in FIG. 28, the second members 22 and 32 of the second lens group G2 and the third lens group G3 are formed by a material that blocks the light, and a pair of left and right aperture sections 25 and 35 that penetrate through the optical axis direction of the first lens group G1 are arranged. In the aperture sections 25 and 35, the left and right lens groups (G2L, G2R; G3L, G3R) of the second and third lens groups G2 and G3 are always positioned within the aperture sections 25 and 35 as seen from the optical axis direction, regardless of the movement of the left and right first members 21 and 31 in the directions perpendicular to the optical axis of the first lens group G1 relative to the second members 22 and 32. Therefore, the aperture sections 25 and 35 have shapes formed by cutting out, in semicircular shapes, left and right end portions (end portions in the moving directions of the lens groups) of the rectangular-shaped apertures extending in the directions perpendicular to the optical axis of the objective lens 1. In the first members 21 and 31, apertures in substantially the same size as the left and right lens groups (G2L, G2R; G3L, G3R) are formed on plate-shaped members that block light, and the left and right lens groups (G2L, G2R; G3L, G3R) are held by being set in the apertures. The first members 21 and 31 have a size (for example, a rectangular shape larger than the aperture sections 25 and 35 as seen from the optical axis direction) that always covers portion other than the lens groups (G2L, G2R; G3L, G3R) in the aperture sections 25 and 35 even if the left and right lens groups (G2L, G2R; G3L, G3R) move in directions perpendicular to the optical axis of the objective lens 1. Therefore, even if the left and right lens groups (G2L, G2R; G3L, G3R) move in directions perpendicular to the optical axis of the objective lens 1 during the change in the magnification, the light does not enter the lens groups (G2L, G2R; G3L, G3R) constituting the second and third lens groups G2 and G3, and the light about to pass through the peripheral section can be blocked. As a result, the light does not enter the following lens groups or optical systems, and the generation of flare or ghost can be prevented.

Modified Example of Second Example

If the first members 21 and 31 are formed in rectangular shapes as shown in FIG. 28, the size of the first members 21 and 31 is a predetermined length in a direction perpendicular to the optical axis to cover the portion other than the lens groups in the aperture sections 25 and 35 even if the left and right lens groups (G2L, G2R; G3L, G3R) move. Therefore, the size of the second members 22 and 32 in the horizontal directions is large at high-power as shown in FIG. 28(a), and the lens groups (G2L, G2R; G3L, G3R) cannot be brought closer to the optical axis of the objective lens 1 than the length in the optical axis direction of the first members 21 and 31 at low-power as shown in FIG. 28(b). As a result, the entire variable power optical system 3 is enlarged.

Therefore, as shown in FIG. 29, the length of the first members 21 and 31 in the direction perpendicular to the optical axis is set to about the size that allows holding the left and right lens groups (G2L, G2R; G3L, G3R, the size just slightly greater than the diameters of the lens groups), and elastic members 26 and 36 that can expand and contract in the direction perpendicular to the optical axis of the objective lens 1 are attached to both end portions of the first members 21 and 31 (shapes for expansion and contraction are the same as in the first example). The elastic members 26 and 36 include inner elastic members 26a and 36a, in which ends on one side are attached to the optical axis side of the first members 21 and 31, and outer elastic members 26b and 36b attached to the other side of the optical axes. The other ends of the inner elastic members 26a and 36a are attached to substantially center sections of the second members 22 and 32 in the direction perpendicular to the optical axis of the objective lens 1 (closer to optical axis than the aperture sections 25 and 35), and the other ends of the outer elastic members 26b and 36b are attached to both end portions of the second members 22 and 32 in the direction perpendicular to the optical axis of the objective lens 1 (more outside than the aperture section 25). The sizes of the inner elastic members 26a and 36a and the outer elastic members 26b and 36b in the width direction (sizes in the vertical direction of FIG. 29) are substantially the same as the sizes of the first members 21 and 31 in the width direction.

According to the configuration of the second lens group G2 and the third lens group G3, if the first members 21 and 31 are moved to move the left and right lens groups (G2L, G2R; G3L, G3R) in the direction perpendicular to the optical axis of the objective lens 1 during the change in the magnification, the elastic members 26 and 36 expand and contract in accordance with the movement of the first members 21 and 31. Therefore, the first members 21 and 31 and the elastic members 26 and 36 can always cover the portion other than the lens groups (G2L, G2R; G3L, G3R) at the aperture sections 25 and 35. Thus, the light does not enter the lens groups (G2L, G2R; G3L, G3R), and the light about to pass through the peripheral section can be blocked. Therefore, the light does not enter the following lens groups or optical systems, and the generation of flare or ghost can be prevented. The elastic members 26 and 36 that expand and contract along with the movement of the first members 21 and 31 are attached to the both end portions of the first members 21 and 31 in the direction perpendicular to the optical axis of the objective lens 1. Therefore, the size of the second members 22 and 32 in the direction perpendicular to the optical axis of the objective lens 1 can be just slightly greater than the periphery of the aperture sections 25 and 35, and the left and right lens groups (G2L, G2R; G3L, G3R) can be brought close to the optical axis of the objective lens 1 to reduce the variable power optical system 3 as a whole.

In this way, as shown in the first and second examples of the microscope apparatus 100, the arrangement of the light shielding units to the lens groups included in the variable power optical system 3 that move in the direction perpendicular to the reference optical axes AL and AR during the change in the magnification can avoid the enlargement of the objective lens in the microscope apparatus including the objective lens and the observation optical system (coupled optical system as a whole), and the imaging optical system can be enlarged to the low-power range while reducing the generation of flare or ghost.

Other Modified Examples

Although the configurations in which the first correction lens group CG1 and the second correction lens group CG2 serving as the variable power optical systems 3 perform decentering operations throughout the entire variable power range have been described, the arrangement is not limited to this. A configuration in which the decentering operations are performed only at sections close to the low-power end where the maximum diameter of the light passing through the objective lens 1 is wide is also possible. Both the variable power optical systems 3 for left and right eyes may perform the decentering operations, or only one of the variable power optical systems 3 may perform the decentering operations. Although the case in which two optical paths (observation optical systems 2) are arranged for the objective lens 1 has been described, the same applies to an arrangement of three or more optical paths (for example, configuration of two observation optical systems and one illumination optical system).

Although the imaging optical system is divided into three optical systems, the objective lens, the afocal variable power optical system, and the imaging lens, in the description, the lens group closest to the image in the afocal variable power optical system and the imaging lens may be designed as one lens group. Even if the light ejected from the objective lens is a convergent or divergent luminous flux in some degree instead of the parallel luminous flux, an imaging optical system similar to the objective lens that ejects the parallel luminous flux can be formed if the following optical systems correct the light. Therefore, the variable power optical system does not have to be an afocal system in the present invention.

REFERENCE SIGNS LIST 1 objective lens 2 observation optical system 3 variable power optical system
G1 first lens group
G2 (CG1) second lens group (first correction lens group)
G3 (CG2) third lens group (second correction lens group)
4 imaging lens 5 imaging optical system 8, 10 illumination optical systems
20, 110, 112 light sources
21, 31 first members 22, 32 second members 25, 35 aperture sections
26, 36 elastic members S, S1, S2 diaphragms H2, H3 light shielding units
IM first image A reference optical axis
100 parallel stereoscopic microscope apparatus (microscope apparatus)

The invention claimed is:

1. An imaging optical system that forms an image through an objective lens and an observation optical system and that is configured to be able to change a magnification of the image, comprising
the observation optical system having a plurality of lens groups, each of the plurality of lens groups separated by a gap along a reference optical axis of the observation optical system, each of at least two lens groups among the plurality of lens groups configured to move in a direction including a component perpendicular to the reference optical axis of the observation optical system in at least part of a section where the magnification is changed from a first power state to a second power state which a lower power state than the first power state.

2. The imaging optical system according to claim 1, wherein
an incident position of a principal ray with a largest angle relative to the reference optical axis of the observation optical system among the principal rays entering the observation optical system in a tangent plane of a plane of the observation optical system closest to the object is changed so that the position approaches the reference optical axis side of the observation optical system at least up to a predetermined focal length state when the magnification is changed from the second power state to the first power state.

3. The imaging optical system according to claim 1, wherein
the observation optical system comprises a plurality of optical paths and ejects light from the objective lens from each of the plurality of optical paths, and each of the optical paths comprises the plurality of lens groups,
at least one of the lens groups that move in the direction including the component perpendicular to the reference optical axis of the observation optical system is a first correction lens group that moves to reduce a distance between the optical axes of the lens groups in the plurality of optical paths when the magnification is changed from the first power state to the second power state, and
remaining lens groups of the lens groups that move in the direction including the component perpendicular to the reference optical axis of the observation optical system are second correction lens groups that correct the optical paths changed by the first correction lens group to eject the light so that the image is formed at an image forming position where the image would be formed when the plurality of lens groups are arranged so that optical axes of the plurality of lens groups match.

4. The imaging optical system according to claim 1, wherein
the observation optical system comprises an afocal variable power optical system, and the afocal variable power optical system comprises the at least two lens groups.

5. The imaging optical system according to claim 1, wherein
the optical axes of the plurality of lens groups substantially coincide in the first power state.

6. The imaging optical system according to claim 1, wherein
the plurality of lens groups comprise: a first lens group arranged closest to the object and fixed during the change in the magnification; and
a second lens group that is arranged on an image side of the first lens group and that is one of the lens groups that move in the direction including the component perpendicular to the reference optical axis of the observation optical system, and
the optical axis of the second lens group is decentered relative to the optical axis of the first lens group in the second power state.

7. The imaging optical system according to claim 1, wherein
the plurality of optical paths of the observation optical system comprises two optical paths for right eye and left eye.

8. A microscope apparatus comprising
the imaging optical system according to claim 1.

9. The imaging optical system according to claim 1, wherein at least one lens group arranged closest to the objective lens among the at least two lens groups moves in a direction X and in a direction Y, the direction X is a direction of the reference optical axis of the observation optical system and the direction Y is a direction away from the optical axis of the objective lens, when the magnification is changed from the second power state to the first power state, while a ratio of a movement amount in the direction Y to a predetermined movement amount in the direction X decreases as the at least one lens group arranged closest to the objective lens among the at least two lens groups moves in the direction X.

10. A stereoscopic microscope apparatus comprising:
an objective lens;
a plurality of afocal variable power optical systems that each eject a parallel light ejected substantially parallel to an optical axis of the objective lens from the objective lens to be a plurality of parallel lights; and
a plurality of imaging lenses that collect the parallel lights ejected from the plurality of afocal variable power optical systems, wherein
at least one of the plurality of afocal variable power optical systems comprises at least two lens groups that move in a direction including a component perpendicular to a reference optical axis of the afocal variable power optical systems in at least part of a section where the magnification is changed from a first end state to a second end state which is lower power state than the first power state, each of the at least two lens groups separated by a gap along the reference optical axis.

11. The stereoscopic microscope apparatus according to claim 10, wherein at least one lens group arranged closest to the objective lens among the at least two lens groups moves in a direction X and in a direction Y, the direction X is a direction of the reference optical axis of the afocal variable power optical systems and the direction Y is a direction away from the optical axis of the objective lens, when the magnification is changed from the second power state to the first power state, while a ratio of a movement amount in the direction Y to a predetermined movement amount in the direction X decreases as the at least one lens group arranged closest to the objective lens among the at least two lens groups moves in the direction X.

* * * * *

UNITED STATES PATENT AND TRADEMARK OFFICE
CERTIFICATE OF CORRECTION

PATENT NO. : 10,895,720 B2  
APPLICATION NO. : 16/559233  
DATED : January 19, 2021  
INVENTOR(S) : Masahiro Mizuta It is certified that error appears in the above-identified patent and that said Letters Patent is hereby corrected as shown below:

In the Claims

Column 42, Line 62:  
In Claim 1, delete "which a lower" and insert -- which is a lower --, therefor.

Signed and Sealed this  
Thirteenth Day of July, 2021

Drew Hirshfeld  
*Performing the Functions and Duties of the*  
*Under Secretary of Commerce for Intellectual Property and*  
*Director of the United States Patent and Trademark Office*